US011936529B2

(12) United States Patent
Woodward et al.

(10) Patent No.: US 11,936,529 B2
(45) Date of Patent: Mar. 19, 2024

(54) NETWORK OF NODES WITH DELTA PROCESSING

(71) Applicant: Oracle International Corporation, Redwood Shores, CA (US)

(72) Inventors: Paul Woodward, Burton-on-Trent (GB); Simon Alexander Tucker, Burton-on-Trent (GB); Stephen Michael Ginns, Narborough (GB)

(73) Assignee: Oracle International Corporation, Redwood Shores, CA (US)

( * ) Notice: Subject to any disclaimer, the term of this patent is extended or adjusted under 35 U.S.C. 154(b) by 80 days.

(21) Appl. No.: 17/469,432

(22) Filed: Sep. 8, 2021

(65) Prior Publication Data

US 2021/0409281 A1 Dec. 30, 2021

Related U.S. Application Data

(63) Continuation of application No. 15/966,439, filed on Apr. 30, 2018, now Pat. No. 11,153,172.

(51) Int. Cl.
*G06F 15/173* (2006.01)
*G06F 16/22* (2019.01)
(Continued)

(52) U.S. Cl.
CPC .......... *H04L 41/12* (2013.01); *G06F 16/2282* (2019.01); *G06F 16/2379* (2019.01);
(Continued)

(58) Field of Classification Search
CPC ....... H04L 41/12; H04L 41/122; H04L 41/34; H04L 41/342; H04L 41/344; H04L 41/40;
(Continued)

(56) References Cited

U.S. PATENT DOCUMENTS 7,117,273 B1 10/2006 O'Toole et al.
7,171,379 B2 1/2007 Menninger et al.
(Continued)

FOREIGN PATENT DOCUMENTS

JP 2001306558 A 11/2001
JP 2009134520 A 6/2009

OTHER PUBLICATIONS

Demetrescu et al., "Trade-offs for fully dynamic transitive closure on DAGs: breaking through the 0 (n2 barrier"), Journal of the association for computing machinery, ACM, vol. 52, No. 2, Mar. 2005.
(Continued)

*Primary Examiner* — Kaylee J Huang
(74) *Attorney, Agent, or Firm* — Potomac Law Group, PLLC

(57) ABSTRACT

Embodiments include systems and methods for managing a network of nodes with delta processing. A network with a plurality of connected nodes can be stored, the nodes representing entities of the network. One or more deltas to the network that indicate updates to the connections among the plurality of nodes can be received. The deltas can be added to a queue. The connections between the nodes of the network can be updated using a delta from the queue. The network can be processed after updating the connections between the nodes to generate a vector for a given node. One or more paths for the given node can be identified based on the generated vector.

20 Claims, 16 Drawing Sheets

(51) Int. Cl.
*G06F 16/23* (2019.01)
*G06F 16/901* (2019.01)
*G06F 16/903* (2019.01)
*H04L 41/12* (2022.01)
*G06F 16/951* (2019.01)
*G06T 11/20* (2006.01)
*H04L 67/10* (2022.01)

(52) U.S. Cl.
CPC .... *G06F 16/9024* (2019.01); *G06F 16/90335* (2019.01); *G06F 16/951* (2019.01); *G06T 11/206* (2013.01); *H04L 67/10* (2013.01)

(58) Field of Classification Search
CPC ......... H04L 67/10; H04L 67/00; H04L 67/01; G06F 16/2379; G06F 16/90335; G06F 16/2282; G06F 16/9024; G06F 16/951; G06F 16/953; G06F 16/9532; G06F 16/9538; G06T 11/206
USPC ................................ 709/223, 224, 238, 239
See application file for complete search history.

(56) References Cited

U.S. PATENT DOCUMENTS

| | | | | |
|---|---|---|---|---|
| 7,661,141 | B2* | 2/2010 | Dutta | G06F 21/6227 |
| | | | | 707/693 |
| 7,748,027 | B2 | 6/2010 | Patrick | |
| 8,082,275 | B2 | 12/2011 | Peuter et al. | |
| 9,177,168 | B2* | 11/2015 | Menten | G06F 21/604 |
| 9,317,574 | B1* | 4/2016 | Brisebois | G06F 16/951 |
| 10,372,689 | B1* | 8/2019 | Yuen | G06F 21/6263 |
| 10,949,812 | B1* | 3/2021 | Deschepper | G06Q 10/20 |
| 2004/0098282 | A1* | 5/2004 | Levy | G06Q 30/02 |
| | | | | 705/317 |
| 2006/0015416 | A1 | 1/2006 | Hoffman et al. | |
| 2006/0259954 | A1 | 11/2006 | Patrick | |
| 2006/0277220 | A1 | 12/2006 | Patrick et al. | |
| 2007/0271379 | A1 | 11/2007 | Carlton et al. | |
| 2009/0198596 | A1* | 8/2009 | Dolan | G06Q 10/06 |
| | | | | 705/28 |
| 2011/0313981 | A1 | 12/2011 | Ben-Natan | |
| 2012/0109789 | A1 | 5/2012 | Bhatt et al. | |
| 2012/0240192 | A1* | 9/2012 | Orazi | G06F 21/10 |
| | | | | 726/4 |
| 2012/0254254 | A1* | 10/2012 | Milousheff | G06F 16/282 |
| | | | | 707/802 |
| 2013/0067114 | A1 | 3/2013 | Hjelm et al. | |
| 2013/0254213 | A1 | 9/2013 | Cheng et al. | |
| 2013/0322298 | A1 | 12/2013 | Alexander, Jr. et al. | |
| 2014/0012833 | A1 | 1/2014 | Humprecht | |
| 2014/0157370 | A1 | 6/2014 | Plattner et al. | |
| 2015/0188945 | A1 | 7/2015 | Kjeldaas | |
| 2017/0171231 | A1 | 6/2017 | Reybok et al. | |
| 2017/0193041 | A1 | 7/2017 | Fuchs | |
| 2017/0270210 | A1* | 9/2017 | Padmanabhan | G06F 16/9024 |
| 2018/0060365 | A1 | 3/2018 | Mujumdar et al. | |
| 2018/0082183 | A1* | 3/2018 | Hertz | G06F 16/288 |
| 2018/0247073 | A1 | 8/2018 | Kreutzer et al. | |
| 2018/0309734 | A1* | 10/2018 | Yu | G06F 21/602 |
| 2019/0327271 | A1 | 10/2019 | Saxena et al. | |

OTHER PUBLICATIONS

International Preliminary Search Report and Written Opinion issued in the corresponding International Application No. PCT/US2019/029098 dated Nov. 3, 2020.
International Search Report and Written Opinion issued in the corresponding International Application No. PCT/US2019/029092, dated Aug. 6, 2019.
Roditty et al., "A fully dynamic reachability algorithm for directed graphs with an almost linear update time", Theory of Comuting, ACM, Jun. 13, 2004, pp. 184-191.
Roditty, A faster and simpler fully dynamic transitive closure, proceedings of the 14th annual ACM-SIAM symposium on discrete algorithms, held Jan. 12-14, 2003 in Baltimore, Maryland.
Unknown, Queue (abstract data type)—Wikipedia, the free encyclopedia, May 2, 2012, retrieved from the internet on Oct. 13, 2015 https://en.wikipedia.org/w/index.php?title=Queue_(abstract_data_type)&oldid=490303871.
Crecelius et al., "Pay-as-you-go Maintenance of Precomputed Nearest Neighbors in Large Graphs", Human Factors In Computing Systems, pp. 952-961, Oct. 29, 2012.
Dong et al., "Maintaining Transitive Closure of Graphs in SQL", Department of Computer Science and Engineering, Wright State University, Dayton, Ohio, pp. 1-23, Dec. 31, 1999.
Tria et al., "Fast and Practical Indexing and Querying of Very Large Graphs", Proceedings of the ACM SIGMOD International Conference on Management of Data, Beijing, CN, pp. 845-826, Jun. 12-14, 2007.

* cited by examiner

FIG. 10

Visualisation 1

| Organization Name | Has Expired Certificates | Country | Organization Summary | Organization Classification | Expired Certificates | Total Certificates |
|---|---|---|---|---|---|---|
| Quality 8 | Yes | Australia | Fine purveyor of quality fruit Products | | 3 | 4 |
| Wholesale 2 | Yes | China | Worldwide distribution of all types of fruit juice concentrates | Product Supplier | 4 | 4 |
| Banana 7 | Yes | Iceland | Fyffes Plc is one of the world's largest importers and distributors of fruits, ranking number five worldwide and number one in Europe | Product Supplier | 2 | 3 |
| Green Veg 4 | Yes | Germany | Need a fruit and veg supplier that can distribute on a national scale? Green Veg is where we started, and we'll always be a fruit and vegetable distributor at heart. | Product Supplier | 2 | 2 |
| Fruits 6 | Yes | India | In Group Eurobanan devote to the activities related with the production, export, import, packaging, packed, manufacturacion, distribution, selection and in definite commercialisation of products | Product Supplier | 1 | 1 |

1000

NETWORK OF NODES WITH DELTA PROCESSING

FIELD

Embodiments of the present disclosure relate to managing a network of nodes with delta processing that provide for efficient graph analysis.

BACKGROUND

In recent years, social networks have demonstrated the usefulness of connectivity. Large networks of connected nodes can allow participating entities to identify new opportunities, whether those are new friendships, business contacts, or other useful connections. These networks also have the potential to unearth latent synergies between groups of connected nodes. However, the benefits of connected nodes are not without risk. Large networks, such as social networks, have been plagued with issues related to data privacy, identity management, and other data sharing concerns. In addition, due to the dynamic nature of the connectivity, performing data analytics on the connected nodes can present unique computing challenges.

SUMMARY

Embodiments of the present disclosure are directed to systems and methods for managing a network of nodes with delta processing that substantially improve upon the related art.

A network with a plurality of connected nodes can be stored, the nodes representing entities of the network. One or more deltas to the network that indicate updates to the connections among the plurality of nodes can be received. The deltas can be added to a queue. The connections between the nodes of the network can be updated using a delta from the queue. The network can be processed after updating the connections between the nodes to generate a vector for a given node. One or more paths for the given node can be identified based on the generated vector.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 10 illustrates a table view of network data according to an example embodiment.

DETAILED DESCRIPTION

Figure 1:
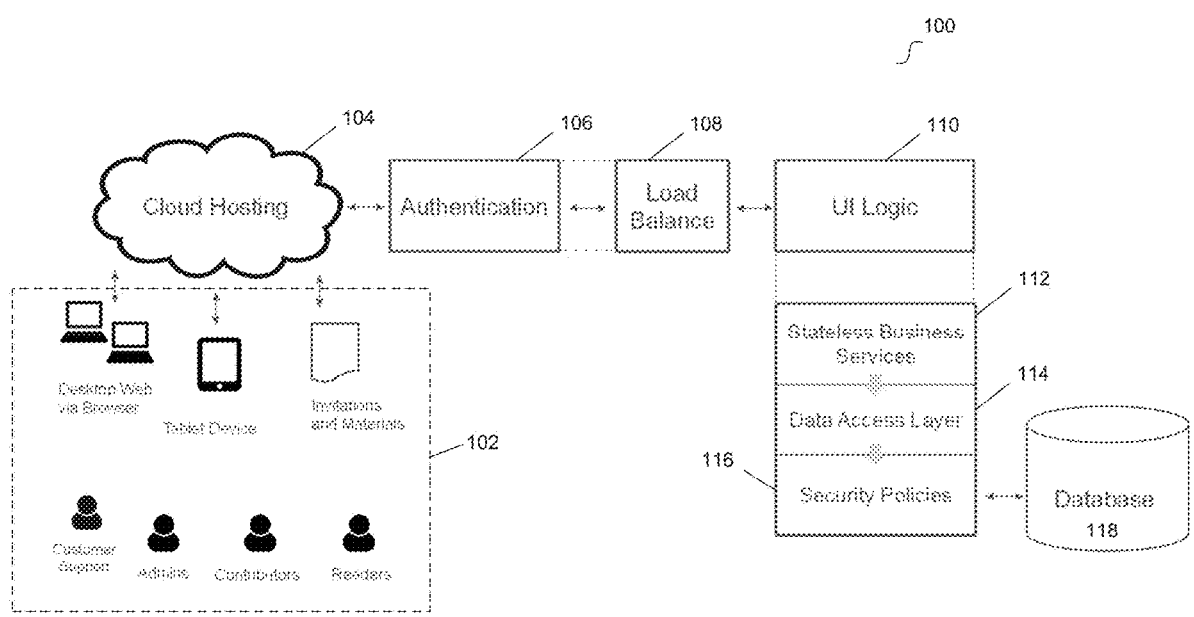
FIG. 1 illustrates a system for managing data processing for a network of nodes according to an example embodiment.

Embodiments manage data processing for a network of nodes. An example network can include a plurality of nodes with a plurality of connections among the nodes. In some embodiments, the network can be a social network with various degrees of information sharing. At times, new connections can be generated between two previously unconnected nodes or a connection can be severed between previously connected nodes. One or more paths can be identified based on the current configuration (e.g., current connections among the nodes) of the network. For example, a path can start at a first node and progress through second, third, and fourth nodes before terminating at a fifth node. Such an identified path can be useful for identifying patterns, trends, or risks, performing predictions, or for other analytical purposes (i.e., depending on the nodes within the network and the specific implementation).

However, the dynamic nature of these networks brings about risks and computing challenges. For example, social networks are often changing, building new nodes connections and tearing down old ones. Thus, path identification among the nodes can be computationally cumbersome. As further detailed herein, embodiments leverage drip fed delta processing to manage the network that achieves computational efficiency while maintaining dynamic update functionality.

In addition, information sharing can be challenging in a network that includes confidential or otherwise sensitive information. In some embodiments, node connections can be further defined (e.g., supplier, customer, potential supplier, potential customer, social connection, and the like) to characterize the relationship between nodes. In these examples, the information shared by a given node in the network can be tailored based on connection type, distance from the given node in the network, and custom preferences for the given node. Embodiments include security protocols to ensure user specific data retrieval according to these information sharing policies.

In some embodiments, the nodes in the network can represent suppliers, intermediaries, and/or customers in a supply chain. For example, connections between nodes can represent various relationships between these entities. A path can represent an extended relationship between multiple entities. For example, a path of multiple nodes connected by supplier/customer relationships can represent a supply chain for a good or product.

Such a network can also be referred to as a graph based on the connections between the nodes. Traversing this graph may be useful, for example, to identify the links in a supply chain, potential links that can be used to adjust a supply chain, risks to a supply chain (e.g., geographical risks, political risks, weather risks, and the like), and for other useful purposes. However, traversing a graph that represents a network of nodes can pose specific computational challenges due to the dynamic nature of some of these networks (e.g., social networks), such as the frequent changes among the connections between nodes.

Embodiments implement a pre-compute solution and a drip-fed delta that aggregates change records in a queue. Upon updating data in the network based on a queued change record (e.g., a drip), the graph can be processed to generate a plurality of direct access vectors for the nodes of the graph. Embodiments include maintaining a version of pre-computed network data that can efficiently retrieve data related to graph traversal. For example, the direct access vector of a given node indicates one or more potential paths that include the given node. In some embodiments, the graph processing/pre-compute solution can include determining a transitive closure.

The pre-compute solution and/or generated direct access vectors can then be used to efficiently traverse the graph. For example, in the described supply chain embodiment, one or more paths can be identified for a given node based on the node's direct access vector, where the paths can be a supply chain, potential supply chain, or some other relationship among customers and suppliers. In various embodiments, the drip fed delta and pre-compute solution maintains a graph (e.g., social network) that is readily available for efficient traversal.

In some embodiments, entities of the network (e.g., nodes) can have authorized users that interact with the system. For example, authorized users can edit a profile for the entity, send messages to other entities of the network, alter relationships with other entities, retrieve data related to the entities of the network, perform a network analysis, and other suitable functions. However, in some embodiments, confidential or sensitive information for one or more entities may be stored (e.g., in a data store) in association with the network. For example, in a social network, the system may store sensitive information for a first entity that can be shared with a subset of other entities, but cannot be shared with the remaining entities. In other examples, the sensitive information may be marked private, and thus may not be shared with any other entities of the social network.

In some embodiments, the system can provide secure data retrieval for entities of the network. For example, a security sub-system can maintain one or more permissions for authorized users that determines what information the users can retrieve. Based on the security sub-system, a data retrieval request can be filtered to ensure the authorized user is only provided with information according to the established permissions. For example, relational filtering can be used to filter generated queries according to the permissions prior to performing a search on the data store. In another example, data redaction can be performed on the data retrieved by a query according to the permissions to redact data prior to providing it to the authorized user. The security sub-system, relational filtering, and data redaction can be used to ensure secure data management of sensitive or confidential data for entities of the network.

In an implementation where the nodes in the network represent suppliers, intermediaries, and/or customers in a supply chain, the secure data management can be used to provide supply chain information to entities of the network. For example, permissions at the security sub-system can be set based on paths of the nodes in the graph that represents the network. Since a path represents a supply chain, entities on a given path can be given permission to retrieve relevant data for the supply chain and analyze the results. Embodiments display graphical user interfaces with supply chain information based on a traversed graph and secured data retrieved. These graphical user interfaces can be useful for identifying risks to a supply chain, analyzing the efficiency of a supply chain, and for other purposes.

Currently, the retail supply chain market is made up of millions of companies from field to fork. Often, these different companies operate different systems and practices for managing product development, sourcing, compliance, order, shipment, quality control, inventory, forecasting, replenishment, and the like. The industry often fails to achieve traceability due to the complexity, adoption and competence of their entire supply chains and this vast array of desperate systems (especially for certain perishable goods, such as food, or other goods that impact health). Integration and API's are limited in reach and have created hundreds of silos. A new wave of transparency solutions and trading networks are simply adding further silos as they compete to own supply chain communities.

Embodiments provide a platform that allows a variety of systems, micro applications, Internet of Things ("IoT") and smart devices (controlled by registration through an app store principle) to exchange common sets of data, transactional key performance indicators (KPIs), and data links with each other. A central environment provides retailers the ability to monitor transactions across a host of processes regardless of system, provides the supply chain an ability to reutilize common sets of data, increasing efficiency, and provides data links that allow the flow of data across the end to end process. Embodiments can bring the community together, for example through social networking capabilities. Adoption is encouraged by providing an efficient platform and service for managing multiple systems and data feeds, for example from one dashboard.

Such adoption can lead to a number of benefits. Reduced duplication can significantly increase efficiency and improve data quality across the entire supply chain. Central reporting, visualizations, and monitoring of transactions across the supply chain improves efficiency, improves speed of response, enables anticipation of risk, and provides vital traceability, for example into incidents that increase risk or cause disruptions. Data links enable various solutions to communicate on business processes improving fulfillment, user experience, and quality. The open connectivity promotes choice of application or device, inspires innovation, motivates adoption, and can be tailored to a vast array of competences across the world.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for managing data processing for a network of nodes according to an example embodiment. System 100 includes client devices 102, cloud server 104, authentication server 106, load balancer 108, user interface logic 110, stateless business services layer 112, data access layer 114, security policies 116, and database 118. Client devices 102 can be computing devices, such as desktops, laptops tablet devices, cell phones, and the like. For example, client devices 102 may be any computing device similar to system 210. In some embodiments, client device 102 can execute an application (e.g., locally stored application, web-based application, and the like) that communicates with cloud server 104 to access a software services for a network of nodes.

For example, the client application can be implemented using one or more web technologies (e.g., HyperText Markup Language ("HTML") 5.0, JavaScript, cascading style sheets (CSS), scalable vector graphics ("SVG"), and the like). Such an application can be viewed both from standard or mobile browsers using a desktop or mobile device. In some embodiments, a downloadable mobile application (e.g., for iOS, Android, and the like) can be developed. For example, the downloadable application can be a container application (e.g., using the Cordova technology) that uses a "control-less" browser internally to display a website. In various embodiments, the user experience with the application is consistent when using a standard browser (e.g., desktop), mobile browsers, downloadable application, or in any other suitable configuration. Example communication sent to and received from client devices 102 can include invitations, network messages, data related to the network, and other materials relevant to the network.

Cloud server 104 can be a server suitable to a host a cloud-based software services platform for the network of nodes. For example, cloud server 104 may be any computing device similar to system 210 and/or may include various modules of the engagement engine ("EE") embedded in Oracle® Cloud, Oracle® Bare Metal, Oracle® WebLogic servers, and/or other suitable components (e.g., an operating system, such as Linux, web technologies, such as Oracle® Java™ Enterprise Edition ("EE"), and the like).

In some embodiments, cloud server 104 is in communication with authentication server 106, load balancer 108, and UI logic 110. For example, a user of one of client devices 102 can be authenticated by authentication server 106. The authenticated user can then be associated with an identity within an identity management service. An example of authentication server 106 is Oracle® Identity Cloud Service ("IDCS"). The user can then access the network application services based on the user's authenticated identity.

Load balancer 108 can be a server or module that distributes load to one or more processors (or one or more computing devices) to effectively manage computing resources of the system. Load balancer 108 can be any computing device similar to system 210.

UI logic 110 can be a server or module that includes software for presenting a user interface to one or more of client devices 102. For example, UI logic 110 can communicate with an application running on one of client devices 102 to present an interface for interacting with the software services for the network of nodes. UI logic 110 can configure one of client devices 102 to display the various graphical user interface disclosed herein.

Stateless business services layer 112 can provides stateless software services for the network of nodes. For example, one or more microservices can be defined that securely retrieve, update, or write network data, traverse the network, send messages to participants in the network, and the like. These stateless microservices are further described herein.

Data access layer 114 can be a software layer that performs data processing functionality, such as query generation. For example, based on requests from the stateless business services layer 112, one or more requests, commands, or updates related to the stored network data may be received at data access layer 114. Queries or commands can be generated for database 118 based on the received requests (e.g., structured query language ("SQL") queries).

Security policies layer 116 can be a software layer that secures data retrieval, updates, or commands for database 118 according to stored security policies. For example, database 118 can be any suitable database for storing network data (e.g., an Oracle® relational database). The network data can include confidential or sensitive information for participants of the network. The updates, commands (e.g., database writes), or retrieval attempts (e.g., queries) from data access layer 114 can be processed by security policies layer 116 to filter the network data according to the stored security policies.

In some embodiments, cloud server 104, authentication server 106, load balancer 108, user interface logic 110, stateless business services layer 112, data access layer 114, security policies 116, and database 118 can be incorporated into a single system or computing device, distributed across various computing devices and, in some implementations, across various locations, a combination of these, of may be configured in any other suitable manner. In example implementations, cloud server 104, authentication server 106, load balancer 108, user interface logic 110, stateless business services layer 112, data access layer 114, security policies 116, and database 118 can be, software, hardware, or a combination of these.

Figure 2:
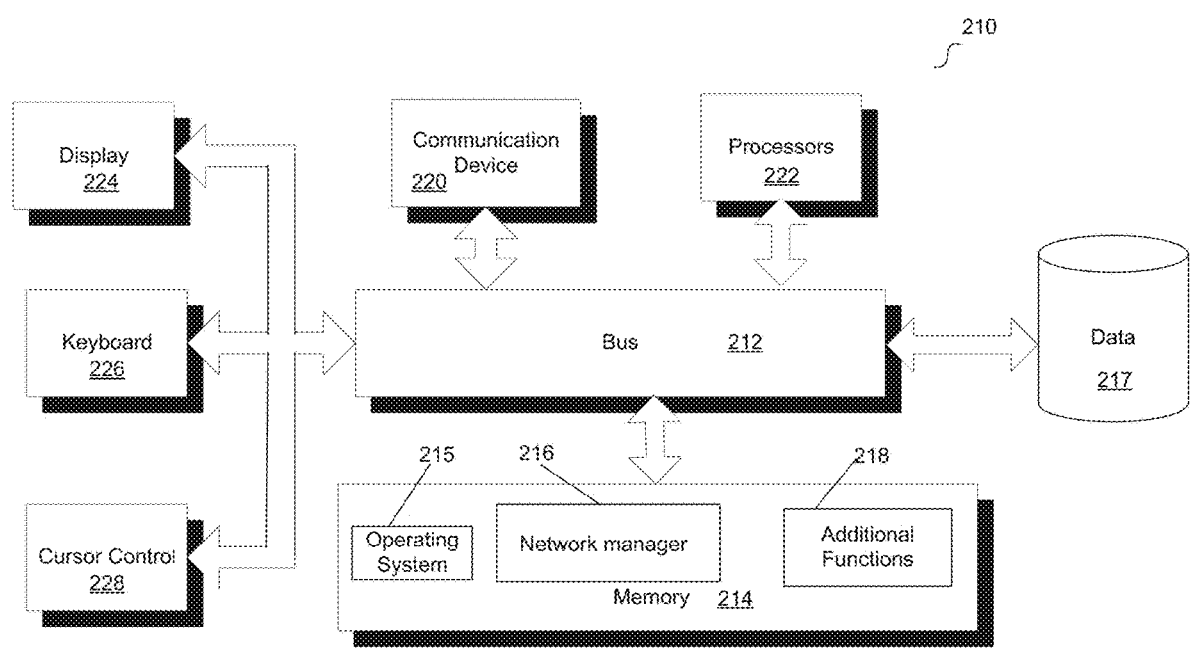
FIG. 2 illustrates a block diagram of a computing device operatively coupled to a network data management system according to an example embodiment.

FIG. 2 is a block diagram of a computer server/system 210 in accordance with embodiments. As shown in FIG. 2, system 210 may include a bus device 212 and/or other communication mechanism(s) configured to communicate information between the various components of system 210, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 210. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, network manager 216, and other applications 218, stored within memory 214.

System 210 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 210. The modules can include an operating system 215, network manager 216, which is configured to manage data processing for the network, as well as other applications modules 218. Operating system 215 provides operating system functionality for system 210. Network manager 216 may include one or more APIs that enables system calls for data processing related to the network, or may further provide any other functionality of this disclosure. In some instances, network manager 216 may be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 210.

In some embodiments, system 210 can be part of a larger system. Therefore, system 210 can include one or more additional functional modules 218 to include the additional functionality. Other applications modules 218 may include the various modules of the engagement engine ("EE") embedded in Oracle® Cloud, for example. A database 217 is coupled to bus 212 to provide centralized storage for modules 216 and 218 and to store, for example, wireless device activity, and in some embodiments, user profiles, transactions history, etc. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, HFDS, or any other database known in the art.

Although shown as a single system, the functionality of system 210 may be implemented as a distributed system. For example, memory 214 and processor 222 may be distributed across multiple different computers that collectively represent system 210. In one embodiment, system 210 may be part of a device (e.g., smartphone, tablet, computer, etc.).

In an embodiment, system 210 may be separate from the device, and may remotely provide the described functionality for the device. Further, one or more component of system 210 may not be included. For example, for functionality as a user or consumer device, system 210 may be a smartphone or other wireless device that includes a processor, memory, and a display, does not include one or more of the other components shown in FIG. 2, and includes additional components not shown in FIG. 2.

Figure 3:
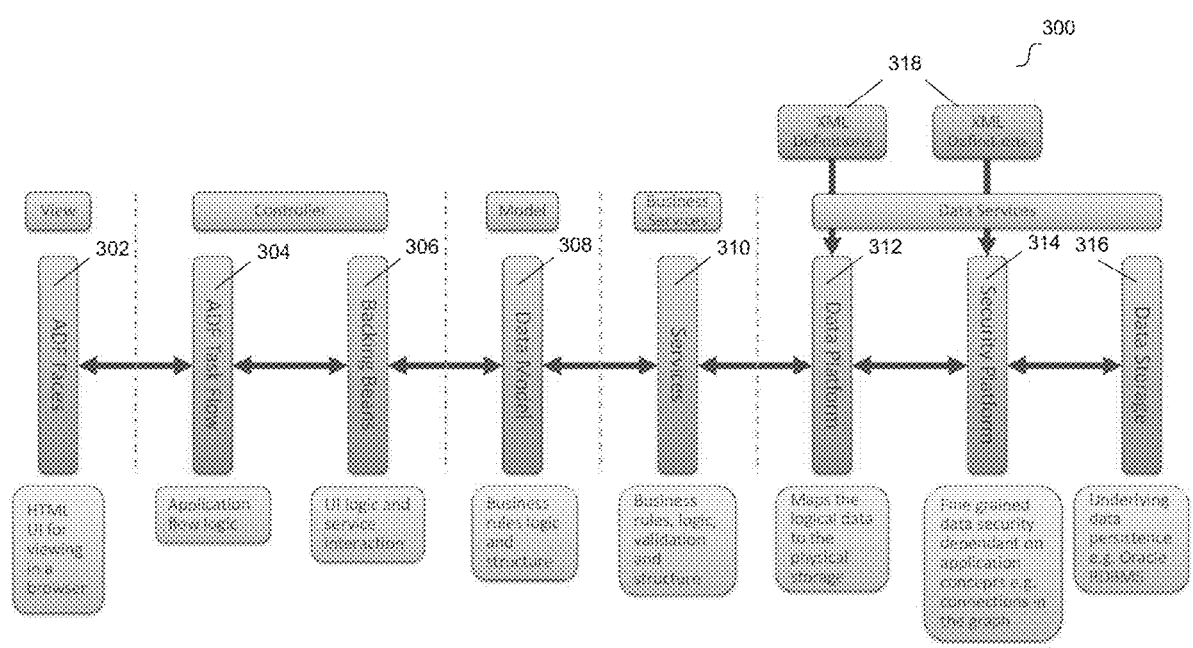
FIG. 3 illustrates a functional diagram for managing data processing for a network of nodes according to an example embodiment.

FIG. 3 illustrates a functional diagram for managing data processing for a network of nodes according to an example embodiment. Diagram 300 depicts an example software framework that can provide services for users of the network. FIG. 3 includes Application Development Framework ("ADF") Faces 302, ADF task flow 304, beans 306, data model 308, services 310, data platform 312, security platform 314, data storage 316, and Extensible Markup Language ("XML") definitions 318.

ADF faces 302 can be the View portion of the software framework that includes HTML, CSS, and any other suitable code for providing a user interface. One of more graphical user interfaces disclosed herein can be provided by ADF faces 302. ADF task flow 304 can be used to configure one or more user interface elements to perform software functions. Beans 306 can provide user interface logic and integration with the business logic rules of the Model layer. ADF task flow 304 and beans 306 can be the Controller portion of the software framework. For example, an ADF task flow 304 can sit on top of beans 306 and implements a framework for a client page. In some embodiments, ADF task flow 304 can provide a set of task flow constructs that can be used to manage a user's journey through a collection of application screens. One or more functions of the elements of the graphical user interfaces disclosed herein can be provided by ADF task flow 304 and/or beans 306.

Data model 308 can be the Model portion of the software framework. Data model 308 can provide business logic rules and structure for interfacing between the user interface (e.g., View and Controller) and the software services (e.g., Business Services portion of the software framework). Services 310 can be the Business Services portion of the software framework. Services 310 can provide business rules, logic, validation, and structure to enable software services to be performed, for example on the stored network data. Services 310 can include one or more of the microservices disclosed herein.

Data Platform 310, security platform 314, and data storage 316 can be the Data Services portion of the software framework. Data platform 312 can map the logical data to the physical storage. For example, based on requests from services layer 310, data platform layer 312 can generate data commands (e.g., queries, change requests, and the like) to retrieve, store, or change data stored at data storage 316. These data commands are secured by security platform 312. Security platform 312 can store security policies used to filter the data commands from data platform layer 312. Thus, the data stored at data storage 316 is security by security platform 312. Data platform 312 and security platform 314 can be defined by XML definitions 318. Thus, these software components are agile, as they can be readily updated and/or rebuilt by updating XML definitions 318. Services 310, data platform 310, security platform 314, and data storage 316 are further described with reference to FIG. 7.

Figure 4:
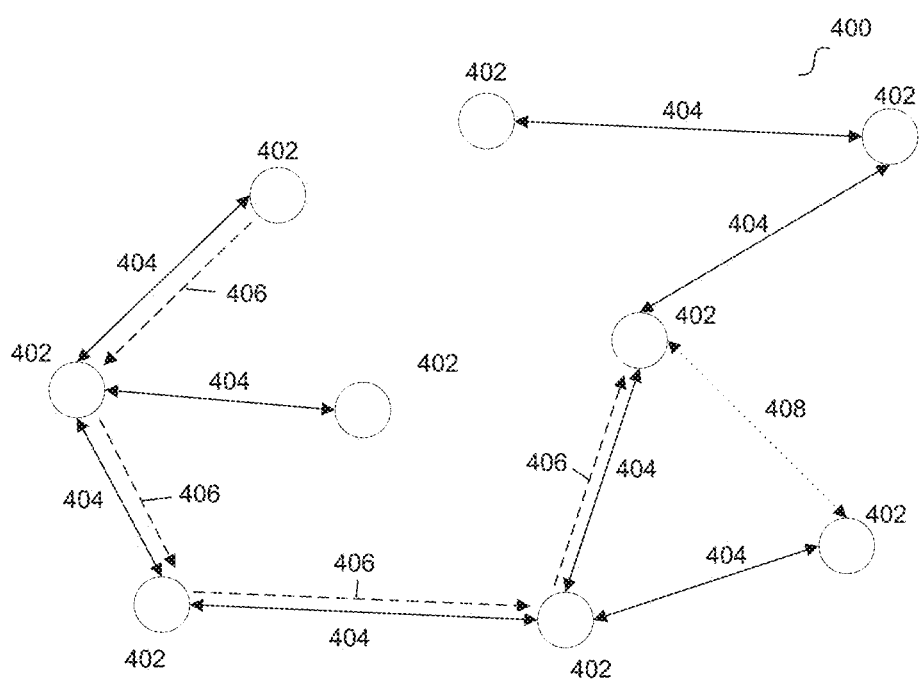
FIG. 4 illustrates a graph that represents a network of nodes according to an example embodiment.

Referring back to FIG. 1, in some embodiments, system 100 can provide software services for the network of nodes represented by a graph. FIG. 4 illustrates a graph that represents a network of nodes according to an example embodiment. Graph 400 can represent a network of nodes 402 and connections 404. Each node 402 can represent an entity that participates in the graph/network and each connection 404 can represent a relationship between entities. In some embodiments, graph 400 is a Directed Acyclic Graph ("DAG") or any other graph suitable to represent a network (e.g., a social network).

In some embodiments, system 100 of FIG. 1 can provide software services for the network represented by graph 400. For example, nodes 402 can each represent an organization, and users affiliated with these organizations can access the network using one of client devices 102. These users can communicate with cloud hosting server 104 and with the remaining elements of system 100 in order to access, manipulate, or interact with the network of nodes. For example, the user's identity can be authenticated by authentication server 106 (e.g., IDCS services, or any other suitable identity management service), and the user can then interact with the network according to the permissions associated with his or her authenticated identity.

In some embodiments, each organization represented by a node 402 can register with the network. For example, a profile can be stored for registered organizations that can include one or more of a name, address or location (e.g., latitude, longitude, home country, and any other suitable location information), brands associated with the organization, a homepage Uniform Resource Locator ("URL"), social media accounts for the organization, a combination of these, and other suitable information.

In an embodiment, the network of nodes can represent a network of suppliers, customers, and/or intermediaries. In such an example, an organization profile can also include one or more of products sold, products purchased, certificates from third party associations, expired certificates form third party associations, direct suppliers (e.g., from among the other entities in the network), direct customers (e.g., from among the other entities in the network), plans for good or products (e.g., recipes), parts for goods or products (e.g., ingredients), a combination of these, and any other suitable information for a buyer or seller of products or goods.

In some embodiments, certificates from third party associations include food or drug safety certifications (e.g., halal certifications, kosher certifications,), fair trade certifications, certifications from one or more known certification entities (e.g., Global Food Safety Initiative ("GFSI"), British Retail Consortium ("BRC"), Food and Drug administration ("FDA"), United States Department of Agriculture ("USDA"), Marine Stewardship Council ("MSC"), Safe Quality Food Institute ("SQF"), and the like), Hazard Analysis and Critical Control Points ("HACCP") certifications, and the like. These certifications often require renewals, and thus the certifications can expire from time to time. Expired certificates can generate a potential problem in a supply chain, depending on the ultimate destination for a good or product (e.g., destination country and local regulations).

In some embodiments, plans for a good or product include a recipe, or a list of ingredients used to make good or product. For example, product A can include one or more recipes, such as recipe B, which lists ingredients C, D, E, and F. An example good or product can be fruit juice. A given organization can be considered a customer of another when the organization has a recipe for a product, such as fruit juice. Ingredients in fruit juice can be fruit concentrates (e.g., cranberry, apple, and the like), different types of fruit, and other suitable ingredients. A given organization can be considered a supplier when the organization has an ingredient for another organization's recipe.

Once registered, organizations can interact with one another in the network. For examples, organizations represented by nodes 402 can send messages to one another, generate posts that can be shared, "like" posts from other organizations, send invites to other organizations to join the network, and perform other functions suitable for a social network.

In some embodiments, one or more paths can be identified in graph 400 among nodes 402 based on connections 404. For example, path 406 can include four of nodes 402, as illustrated in FIG. 4. In an embodiment where nodes 402 represent entities that can be customers, suppliers, and intermediaries for transactions involving goods or products, and path 406 can represent a supply chain. For example, path 406 can represent a flow of goods or products among nodes 402 terminating at an end-point (e.g., customer). In some embodiments, the end-point can be one of nodes 402 that represents an entity within the supply chain requesting information. For example, node 402 that represents the end-point of the path 406 can request information about the flow of goods or products to the entity representing the node. In some instances, this end-point may be an intermediary, as the entity may sell a good or product to a downstream customer, however path 406 can represent a supply chain for that entity. An authorized user of the entity (e.g., authenticated identity) can interact with software services for the network to retrieve this supply chain information, as will be further detailed below.

In some embodiments, connections 404 can represent trading relationships between organizations (e.g., customers and suppliers). For example, organization A can invite organization B to become one of its suppliers and/or organization B can invite organization A to become one of its customers. This may occur when organization B has an ingredient for one of organization A's recipes. Within the network, a connection 404 between organization A and organization B can be made when a trading relationship invitation is sent from one of the organizations and is accepted by the other.

In an embodiment, once two organizations have sent and accepted invitations to be in a trading relationship, they can identify which recipes and ingredients rely on this relationship. The customer organization can attribute some of the ingredients used in its recipes to the new supplier organization. Similarly, the supplier organization can attribute recipes for products that it supplies with the name of the customer organization. With respect to FIG. 4, when connections 404 represent trading relationships, graph 400 shows the potential flow of goods between trading organizations (e.g., the supply chain). For example, when a supplier organization has at least one product recipe associated with the customer organization and the customer organization has a recipe with at least one ingredient associated with the supplier organization, the supplier organization will be shown within (is considered part of) the customer organization's supply chain.

In some embodiments, connections 404 can represent social relationships (that do not trade). For example, organization A can submit a social connection request to organization B, and a connection 404 can be formed that represents a social connection.

Figure 5:
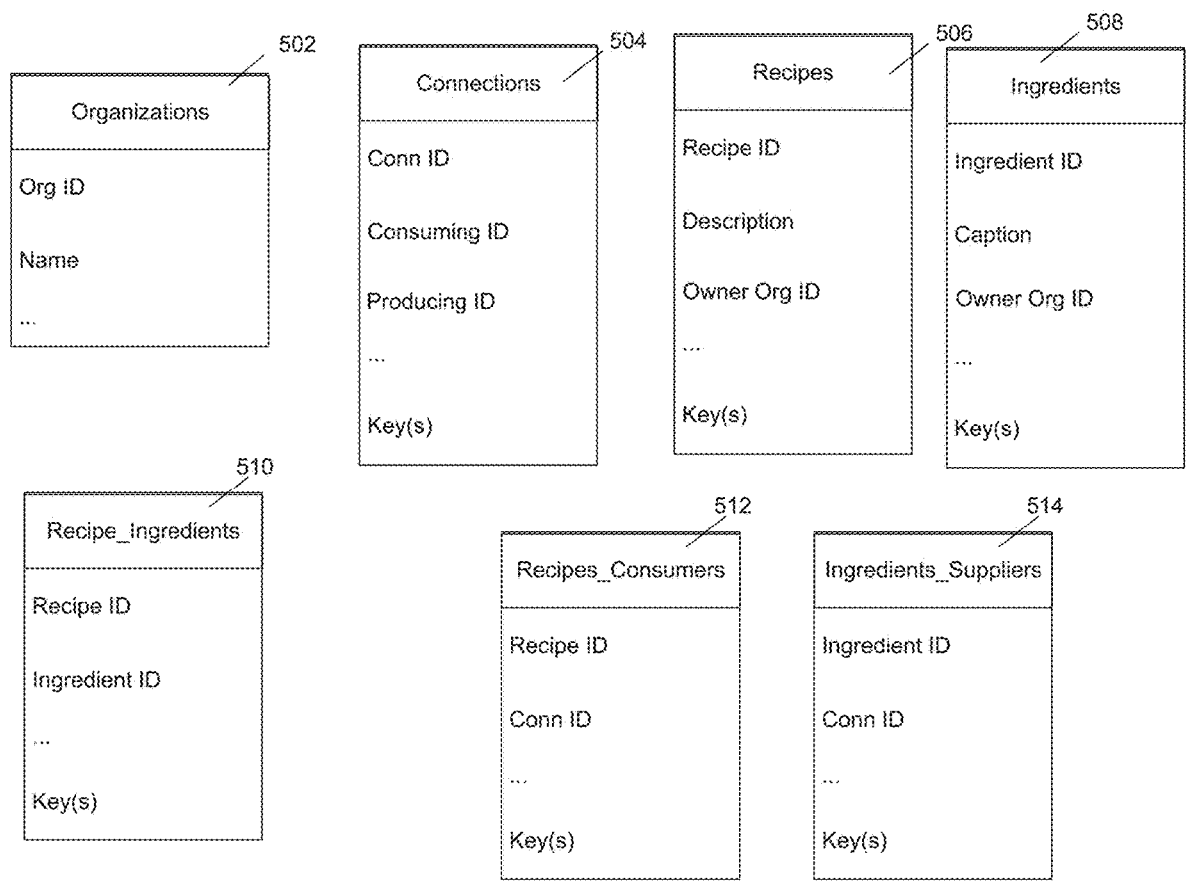
FIG. 5 illustrates relational data tables for network data processing according to an example embodiment.

In some embodiments, the network data can be mapped onto a plurality of relational data tables in a relational database. FIG. 5 illustrates relational data tables for network data processing according to an example embodiment. The example data tables illustrated in FIG. 5 include Organizations 502, Connections 504, Recipes 506, Ingredients 508, Recipe_Ingredients 510, Recipes_Consumers 512, and Ingredients_Suppliers 514. The data tables can include attributes (e.g., ID, name, and the like) and, in some instances, key information (e.g., primary keys and foreign keys). The illustrated data schema has been simplified for the purposes of this disclosure, and an implementation of the data schema for the network data can be substantially larger than the illustrated example. Other suitable schema can also be implemented.

In some embodiments, Organizations 502 can store organization profile information, such as an organization ID, a name, other profile information detailed herein, and any other suitable organization profile information. Connections 504 can store information about connections between nodes, such as a connection ID, consuming ID (e.g., customer ID), producing ID (e.g., supplier ID), and any other suitable connection information. In some embodiments, connections between nodes can be based on a realized flow of a good or product (e.g., a realized supplier/customer relationship).

In some embodiments, Recipes 506 can store recipe information, such as a recipe ID, a recipe description, an owner organization ID, and any other suitable recipe information. Similarly, Ingredients 508 can store ingredient information, such as an ingredient ID, an ingredient caption, an owner organization ID, and any other suitable ingredient information. Recipe_Ingredient 510 can store associations between owned recipes and owned ingredients.

In some embodiments, Recipes_Consumers 512 can store information that associate recipes with connections that consume recipes, such as connections between organizations represented by a connection ID stored in Connections 504. Similarly, Ingredients_Suppliers 514 can store information about ingredients and connections that supply the ingredients. For example, Recipes_Consumers 512 and Ingredients_Suppliers 514 can be used to determine how organizations from a given connection are connected (e.g., the recipe/ingredient trading relationship that exists between them).

For example, a recipe A owned by a first organization can include ingredients B, C, and D. Ingredients owned by a second organization can include ingredients D, E, and F. Because the first organization owns a recipe that includes an ingredient owned by the second organization, ingredient D, a potential flow of good or product exists between the first and second organizations. In some examples, a trading relationship can be confirmed by the first and second organizations, and thereby a connection (with a connection ID) can be formed. Once connected, the first organization can associate recipe A with the connection and the second organization can association ingredient D with the connection. The tables illustrated in FIG. 5 can be populated with the relevant connection, ingredient, and recipe information.

Referring back to FIG. 4, mapping the network of nodes onto data tables can include storing entity specific (e.g., organization profile) information for nodes 402 in Organizations 502 and storing node connection information for connections 404 in Connections 504. As detailed below, processing the network to generate vectors for nodes 402 can be managed based on associations between owned recipes and owned ingredients that are indicated by Recipes 506, Ingredients 508, Recipe_Ingredient 510, Recipes_Consumers 512, and/or Ingredients_Suppliers 514.

In some embodiments, an update or change may be requested by a user (e.g., associated with one of the nodes/entities of the network). For example, an authenticated user may request a change to the network, such as a change to a flow of good or product (e.g., new or updated supplier/customer relationship), a new flow of good or product, change to an owned recipe or ingredient, a new recipe or ingredient, or any other suitable change. A change to the network may also include creation of a new node/entity based on a newly registered organization. The new node/entity may generate connections with existing entities/nodes based on existing or new flows of goods or products.

New connection 408 illustrated in FIG. 4 can be the result of a change to graph 400. For example, the nodes 402 connected by new connection 408 may enter into an agreement for trading a good or service. Based on the update to graph 400, new paths and new potential paths are generated.

As detailed herein, processing requests to traverse a graph, such as a social graph, with a high frequency of changes can be computationally challenging. Embodiments implement drip fed delta processing to provide an efficient technique for traversing graph 400 even in the presence of frequent changes.

Figure 6:
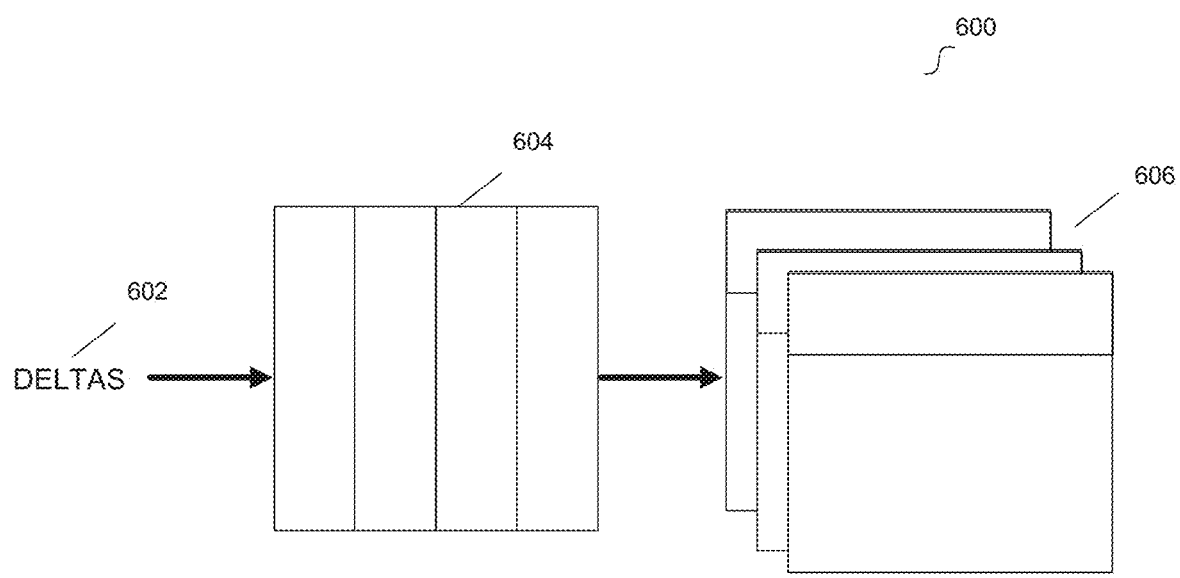
FIG. 6 illustrates a flow diagram for delta processing for a network of nodes according to an example embodiment.

FIG. 6 illustrates a flow diagram for delta processing for a network of nodes according to an example embodiment. Deltas 602 can be requested updates or changes to network data 606 (e.g., stored in relational data tables). Deltas 602 can be stored in queue 604, such as a First in First Out (FIFO) queue or any other suitable queue. Each processed change or update can be considered a drip in the drip fed delta processing flow. When the update or change is performed on network data 606, one or more paths or potential paths between entities of the network may be changed. For example, one of deltas 602 may result in a change that generates a connection similar to new connection 408 and/or that generates a new (or new potential) flow of a product or good (e.g., based on changes to owned ingredients, recipes, or products). Upon completing an update to network data 606, a next drip can be executed (e.g., network data 606 can be updated or changed according to deltas 602 at the top of queue 604).

In some embodiments, network data 606 can represent a pre-computed version of the underlying network data (e.g., stored in relational tables illustrated in FIG. 5). For example, network data 606 can be pre-computed data that is useful for efficient retrieval of network information, such as paths among nodes/entities (e.g., supply chain information). Users (e.g., authenticated users with the proper security) can readily update/change the underlying network data, for example by logging in and interacting with a client application, and these updates/changes can be reflected in the underlying network data without use of a queue. However, deltas 602 can represent updates/changes that affect network data 606 (e.g., the pre-compute version of the underlying network data). Embodiments implement the drip fed delta technique when updating network data 606 to maintain this pre-computed version of the underlying network data that is useful for efficient retrieval of network information.

In some embodiments, network data 606 is stored in a set of relational data tables that is separate from the underlying network data. Network data 606 can be considered a copy of the underlying network data in a pre-computed form. In order to maintain this pre-computed form (and the benefits of efficient network data retrieval), updates are managed by the disclosed drip fed delta techniques. In other words, it is updates/changes to the separate set of relational data tables (e.g., deltas 602) that are queued (e.g. in queue 604) and executed as drip deltas. Network data 606 is eventually consistent with the underlying network data (after execution of the drip deltas) and provides structures that enable high performance querying of the network.

In some embodiments, the processing of deltas 602 is performed under a best efforts condition based on the available computing resource. Processing delays can be due to disparities between the rate that servers can generate deltas 602 (from users' activities) and the rate at which a pre-compute engine can process/remove them from queue 604. In some embodiments, delta processing may be delayed and/or may be performed at a predetermined interval (e.g. a delay may be built into the processing).

In some embodiments, updates/changes to the underlying network data (e.g., changes to the relational data tables of FIG. 5), can be tracked to determine changes that affect the separate data tables that store network data 606. For example, the following scenarios represent changes that affect network data 606 (e.g., changes to be queued):
1) Two organizations create a new trading relationship or terminate an existing trading relationship;
2) Two organizations terminate an existing trading relationship;
3) Recipes or ingredients maintained by a customer or supplier are updated to associate new organizations as being customers (of products/recipes) or suppliers (of ingredients); and
4) Recipes or ingredients maintained by a customer or supplier are updated so that they remove organizations as being suppliers of an ingredient or customers of a product/recipe.

In some embodiments, updates/changes to the underlying network data can be tracked to identify one or more of these above scenarios. For example, with reference to the relational table structure of FIG. 5, the following updates/changes can be identified as affecting network data 606.

Consumers added/deleted to/from recipes (INSERT, DELETE on RECIPE_CONSUMERS 512)
Ingredients added/deleted to/from recipes (INSERT, DELETE on table RECIPE_INGREDIENTS 510)
Suppliers added/deleted to/from ingredients (INSERT, DELETE on table INGREDIENT_SUPPLIERS 514)

Note that, in each of these cases, changes can be implemented by a user (e.g., authenticated user with permissions) using a client application. Embodiments of the disclosed techniques produce deltas 602 corresponding to these changes that are used to update network data 606 to maintain the pre-computed version of the underlying network data.

In some embodiments, database functionality (e.g., Oracle® RDBMS Triggers) can be used to process deltas 602. Example techniques for queuing include Oracle® Advanced Queuing ("AQ"). Deltas 602 from queue 604 can be processed, and the data tables storing network data 606 (e.g., including the transitive closure for the graph) can be incrementally updated. In some embodiments, multiple queue consumers can be implemented in, and these can be shared by various organizations. An example schema for data tables that store network data 606 can be as follows:

PC_RECIPE_CON_SUP—Stores a Pre-Compute copy of a Recipe to Consuming Organization relationship (Recipe ID, Consuming Organization ID and Supplying (Owning) Organization ID).
PC_RECIPE_INGREDIENTS—Stores a Pre-Compute copy of an Ingredient to Recipe relationship (Recipe ID and Ingredient ID).
PC_INGREDIENT_CON_SUP—Stores a Pre-Compute copy of an Ingredient to Supplying Organization relationship (Ingredient ID, Consuming (Owning) Organization ID and a Supplying Organization ID).
PC_INGREDIENT_CONNECTIONS—Stores a Pre-Compute version ingredient to ingredient connections that are possible and can therefore be used for traversal through the network. This is used to aid incremental evaluation of the transitive closure.
PC_ORG_TC_RECURSIVE—Stores a Pre-Compute version of the organization to organization transitive closure and is one of the tables used by the application to query the network. In some embodiments, the design of the table is simple and consists of an ID (of that recursive transitive closure entry), a Consuming Organization ID and a Supplying Organization ID.
PC_ORG_TC_PATH—Stores a Pre-Compute version of all of the ways (paths) that one can get from the Consuming Organization ID to the Supplying Organization ID in PC_ORG_TC_RECURSIVE.
PCORG_TC_ING_CONNPATH_H—This table holds the header records for ingredient paths. This record includes the organization transitive closure path ID from PC_ORG_TC_PATH that this ingredient path is making possible. This is used to aid incremental evaluation of the transitive closure.
PC_ORG_TC_ING_CONN_PATH_D—This table holds the detail records for the ingredient path from PC_ORG_TC_ING_CONN_PATH_H. This is used to aid incremental evaluation of the transitive closure.

Embodiments include generating updates/changes (e.g., deltas 602) to the data tables that store network data 606 (e.g., the above schema) that correspond to tracked changes identified as affecting network data 606. For example, a tracked change may be identified as an update to trading relationship between two entities/nodes. One of more deltas 602 can be generated to update the data tables that store network data 606. For example, based on the implemented schema, a tracked change may correspond to a plurality of deltas 602 that update/change a plurality of tables that store network data 606.

In some embodiments, executing a drip (e.g., delta) includes determining a transitive closure of the network. Referring to FIG. 4, a transitive closure of graph 400 can be maintained for a given node based on a subset of nodes 402 that are part of a path or potential path with the given node. Potential connections or flows of goods or products can be identified based ingredients, recipes, associate entities/nodes, and relevant information stored and updated in the data schema maintained for network data 606 (e.g., the above disclosed data schema). Generally, for a given node, the transitive closure of graph 400 represents the subset of nodes 402 that can be included on a path (e.g., existing or potential) with the given node. The transitive closure for graph 400 may be determined in any suitable manner (e.g., breadth-first or depth-first search of the graph, Floyd-Warshall algorithm, and the like).

When determining a transitive closure, a rule or set of data can be used that enumerates a path from a node to other nodes. In various embodiments, established trading relationships among nodes/entities can be used as the technique for enumerating paths. The following is an example algorithm for determining a transitive closure of graph 400:

```
For a node X:
   For each Recipe of X,
      For each IngredientoftheRecipe
         For each Supplier of the ingredient.
            Add the supplier to a list of potential supplier nodes.
   For each node in the "potential supplier nodes" list.
         Check to see if the node has at least one recipe marked with node X as a
customer
            If NOT then remove the node from the "potential supplier nodes" list
```

```
//A "potential supplier node" is the next level of nodes in the supply chain for node X.
The algorithm is preformed recursively over each node in the list to produce the node's
next level of suppliers. For each new recursion, the node that is the subject of the
current iteration becomes the new "X".
```

The results of the determined transitive closure can be stored as network data 606 (e.g., in data tables similar to the example schema). With reference to FIG. 6, deltas 602 can be generated based on one or more changes to the underlying network data (e.g., stored in the data tables of FIG. 5) executed by a user such that each data table that stores the network data 606 that is affected by the change to underlying network data is updated. In other words, given a network data change to a piece of information A, deltas 602 can be generated to update any data table for network data 606 that either stores information A or stores information that is dependent upon information A.

In some embodiments, maintaining the transitive closure of graph 400 includes modifying the pre-computed version of the network data (e.g., network data 606) rather than re-computing the entire transitive closure. If a complete rebuild is requested, for instance based on a database failure or some other need, a rebuild of the transitive closure can be performed based on the connections, recipe, and ingredient records.

In some embodiments, the determination of the transitive closure for graph 400 provides a direct access vector for each of nodes 402. For example, a transitive close for graph 400 can provide a list of all nodes that can be reached from a given node:

Given a node "X", the closure for "X" is a list of objects where each object is represented by:
1) The ID of the node ("Y") that can be reached from "X"
2) A set of alternate paths which describe all the possible ways of reaching "Y" from "X" within the graph. Each alternate path can include a list of node IDs what would be traversed from "X" to reach "Y".

The direct access vector for a given node can be selected against in a relational data query to return a subset of nodes that are part of a path with the given node. In other words, a request to traverse graph 400 and return a path for a given node can use the direct access vector for the given node and a relational query to efficiently retrieve the requested network data from the relational data tables (e.g., data schema for network data 606). Embodiments provide a computationally efficient technique for traversing graph 400 in order to provide network software services, such as path identification and corresponding data retrieval.

In some embodiments, software services, such as stateless microservices, can be leveraged to access, update, change, delete, or retrieve data for the network of nodes. The delta processing for updates or changes to the network data allows for efficient access of this data, however, some organizations may store sensitive or confidential information in the system. Thus, a security policy and secure filtering of network data can be provided to further improve upon the management of network data.

Figure 7:
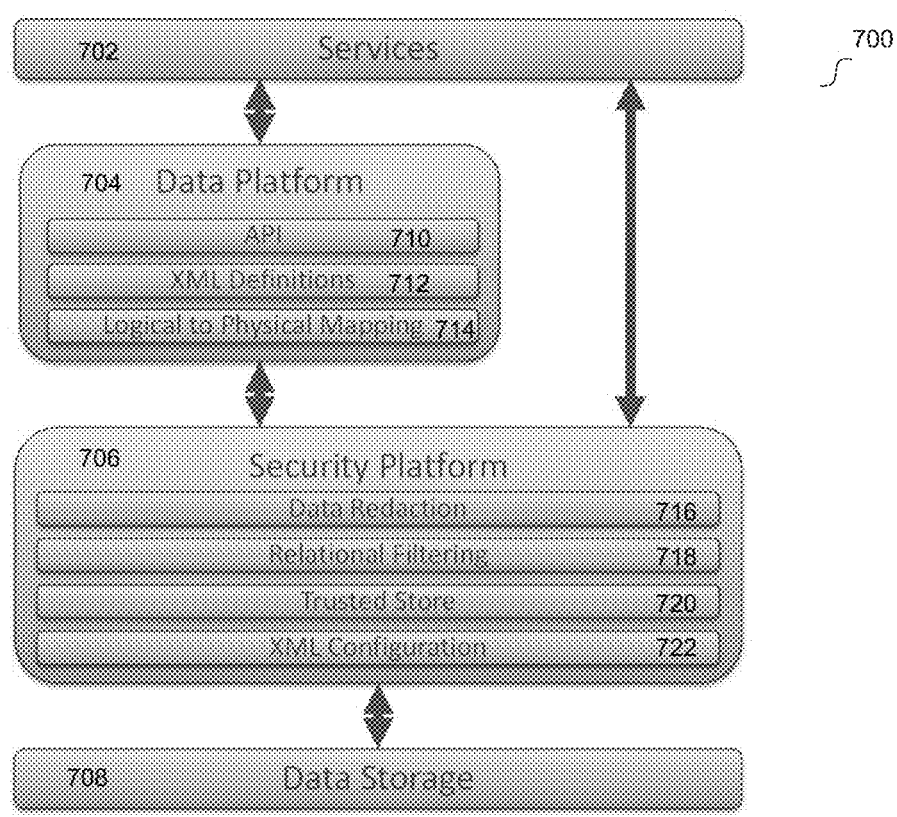
FIG. 7 illustrates a functional diagram for secure management of data processing for a network of nodes according to an example embodiment.

FIG. 7 illustrates a functional diagram for secure management of data processing for a network of nodes according to an example embodiment. For example, diagram 700 can represent software functionality for achieving the secure data processing for a network of nodes disclosed herein.

Diagram 700 includes services 702, data platform 704, security platform 706, and data storage 708. Data platform 704 can include application programming interfaces ("APIs") 710, XML definitions 712, and logical to physical mappings 714. Security platform can include data redaction 716, relational filtering 718, trusted store 720, and XML configurations 722. In some embodiments, services 702, data platform 704, security platform 706, and data storage 708 can be similar to services 310, data platform 312, security platform 314, and data storage 316 of FIG. 3.

In some embodiments, services 702 can include a plurality of microservices provided for a user to interact with the network of nodes. For example, a user (operating a client device) affiliated with a registered organization (e.g., entity of the network) can call various microservices, using a plurality of exposed APIs, to interface with the network system and access network data.

In some embodiments, services 702 communicate with data platform 704 using API 710 in order to access, update, change, or delete network data stored at data storage 708. XML definitions can define the data that is retrievable from data storage 708. Further, logical to physical mappings 714 can be used to map logical data requests or commands to physical level requests or commands (e.g., relational data queries).

In some embodiments, the physical level requests or commands (e.g., structured query language ("SQL") commands or queries) are communicated to security platform 706 for filtering or augmenting according to stored security protocols before executing these requests or commands on data storage 708. Trusted store 720 is an immutable source of security policy for the network that stores access permissions for registered users and organizations.

For example, access to data store 708 can be secured according to access permissions stored at trusted store 720. In some embodiments, trusted store 720 can store an organization key that is used to write first organization profile data. In this example, users of the first organization will be able to write profile data to their own organization, but are prevented from writing profile data to any other organization, even if such a write is requested by one or more of services 702, or by other code of the network system.

In some embodiments, queries or commands (e.g., SQL) transmitted from data platform 704 can be filtered or augmented by relational filter 718 according to the security policies stored at trusted store 720. Further, any data retrieved by a filtered or augmented query can be redacted by data redaction 716 according to the security policies stored at trusted store 720. In some embodiments, security platform 706 can be configured using XML configuration 722, which includes a plurality of XML files that define the security protocols (e.g., access permissions, query filtering, and data redaction).

Embodiments include a plurality of stateless microservices that are available for interfacing with the network system. In one embodiment, a microservice is an independently deployable service. In one embodiment, the term microservice contemplates a software architecture design pattern in which complex applications are composed of small, independent processes communicating with each other using language-agnostic APIs. In one embodiment, microservices are small, highly decoupled services and each may focus on doing a small task. In one embodiment, the microservice architectural style is an approach to developing a single application as a suite of small services, each running in its own process and communicating with lightweight mechanisms (e.g., an HTTP resource API). In one embodiment, microservices are easier to replace relative to a monolithic service that performs all or many of the same functions. Moreover, each of the microservices may be updated without adversely affecting the other microservices. In contrast, updates to one portion of a monolithic service may undesirably or unintentionally negatively affect the other portions of the monolithic service. In one embodiment, microservices may be beneficially organized around their capabilities. In one embodiment, the startup time for each of a collection of microservices is much less than the startup time for a single application that collectively performs all the services of those microservices.

In one embodiment, microservices architecture refers to a specialization (i.e., separation of tasks within a system) and implementation approach for service oriented architectures ("SOAs") to build flexible, independently deployable software systems. Services in a microservices architecture are processes that communicate with each other over a network in order to fulfill a goal. In one embodiment, these services use technology-agnostic protocols. In one embodiment, the services have a small granularity and use lightweight protocols. In one embodiment, the services are independently deployable. By distributing functionalities of a system into different small services, the cohesion of the system is enhanced and the coupling of the system is decreased. This makes it easier to change the system and add functions and qualities to the system at any time. It also allows the architecture of an individual service to emerge through continuous refactoring, and hence reduces the need for a big up-front design and allows for releasing software early and continuously.

In one embodiment, in the microservices architecture, an application is developed as a collection of services, and each service runs a respective process and uses a lightweight protocol to communicate (e.g., a unique API for each microservice). In the microservices architecture, decomposition of a software into individual services/capabilities can be performed at different levels of granularity depending on the service to be provided. A service can be a runtime component/process. Each microservice can be a self-contained module that can talk to other modules/microservices. Each microservice can have unnamed universal port that can be contacted by others. In one embodiment, the unnamed universal port of a microservice is a standard communication channel that the microservice exposes by convention (e.g., as a conventional Hypertext Transfer Protocol ("HTTP") port) and that allows any other module/microservice within the same service to talk to it. In one embodiment, the microservices are independent of one another, atomic, and stateless. A microservice or any other self-contained functional module can be generically referred to as a "service".

For example, one of the stateless microservices can be an identity management service used to authenticate the identity of the user, such as an IDCS microservice. For example, a user associated with an organization can provide their organization credentials, and the IDCS microservice can be configured to perform authentication using the identity management systems of the user's organization to ensure the identity of the user is properly authenticated by the relevant system. The following example represents a subset of an API for an IDCS microservice:

User GetCurrentUser gets the current user identified by the currently logged in user.

User GetUser(String emailAddress)

gets the user identified by the email address. It queries IDCS against the Username attribute.

String CreateUser(User toCreate)

creates a new user and adds them to a group. The groups display name is configurable in the context parameters of the application (web.xml). The IDCS group that the user is added to can be searched before the user is created. The search can call an API and search for a group with a display name that matches the configured parameter. Once found, it can extract the group Id (not visible through the UI) and use that to create an update (PATCH) request to the IDCS server to add the newly created user. The newly created user ID (GUID) is returned after the operation is successful.

In some embodiments, the various microservices can be dependent on APIs from one another to perform a function. For example, the IDCS microservice may be dependent on functions provided by one or more other microservices in order to accomplish the functionality described above for the example API. Further, the IDCS microservice can request functionality from an organization's identity management system in order to fully implemented user authentication. For example, an organization can implement a cloud based user authentication system, such as the one described in U.S. Pat. No. 9,838,376.

In another example, one or more microservices can be used to create, read, update, or delete ("CRUD") network data from data storage 708. For example, various microservices can expose a custom or a CRUD interface that provides access to "business functions" that the microservice represents. In some examples, a microservice can represent a business entity (e.g., a company profile, a list of invitations, a recipe, and the like). The CRUD verbs can allow the corresponding stream of entities to be read or manipulated. As will be further detailed below, such services can further rely on the functionality of security platform 706 to ensure compliance with the security policies of the system. The following example represents a subset of an API for one or more CRUD microservices:

```
Void Create(T items)
Void Create(IDDRS<T> items)
IDDRS<T> Read(Map<String,Object> parameters, FilterClause filterClause, SortClause
sortClause)
IDDRS<T> Read(Class<T> returnDataRecordClass, Map<String,Object> parameters,
FilterClause filterClause, SortClause sortClause)
PagedData<?> ReadPage(Map<String,Object> params, , FilterClause filterClause,
SortClause sortClauseOverride, int firstRecord, int PageSize)
```

```
IDDRS<T> ReadMetaData( )
Void Update(IDDRS<T> updates)
Void Delete(IDDRS<T> deletes)
Void UpdateCreate<IIDRS<T> updateCreates)
CRUD Base
```

Implementation of the ICRUD interface to be used by the service implementation that wish to use standard CRUD on the underlying data repository.

The CRUD based will expect a data repository id to direct the CRUD operations.

Generic CRUD

Generic data implementation of the ICRUD interface for un-typed CRUD actions on a data repository. The service will expect a data repository id to direct the CRUD operations.

CRUD Factory

A factory which construct the generic data implementation of the ICRUD interface In another example, an organization microservice can be used to manage information for organizations registered with the network of nodes. For example, each organization can have a profile with a plurality of attributes, as previously disclosed. The organization microservice can call one or more functions of the CRUD microservices to access, create, or update organization information stored in data storage 708. For example, the following functions can be provided by the organization microservice:

Create
  Standard create based on CRUD microservices
  Relies on data constraints in the data source to enforce mandatory fields
Read
  Standard read based on CRUD microservices
Update
  Standard update based on CRUD microservices
  Relies on data constraints in the data source to enforce mandatory fields
Update Create
  Standard update create based on CRUD microservices
  Relies on data constraints in the data source to enforce mandatory fields The organization microservice can also be used by a user to find organization specific information and retrieve products of an organization. The following example represents a subset of an API for an organization microservice:

Public IDynamicDataRecordSet<Organisation>find(long orgId)
Public IDynamicDataRecordSet<Product>getProducts (Organisation org)

In some embodiments, an IDynamicDataRecordSet (IDRS) is a generic data structure that allows variable streams of data to be represented. An IDRS can include several parts:

1) A List of records, for example one per entity, that the data stream represents.
2) Each entity record can have a set of attributes pairs: Attribute ID and attribute value.
3) Each entity record can itself contain a list of entity records. Example that include such a feature can allow hierarchical representation.
4) Parallel to the above data, an IDRS can contain metadata. The metadata can have an entry for each attribute available in the entity records. This metadata describes characteristics of the data. Example are:
  a. Physical Data type on the data base, Eg Text
  b. Business Type—Eg Password
  c. Range of possible Values
  d. Mandatory Flag
  e. Validation rule
  f. Default Value
  g. And the like.

Embodiments that utilize an IDRS can leverage the benefits of the data structure at least because the structure can represent values, records, lists, hierarchies, and other concepts in a standard manner. These representations can be self-describing, for example due to the included metadata. Embodiments of network data can be represented as IDRS structures. Such embodiments allow general processing units or UI components to accept a weird array of data, at least because the IDRS structure provide indications about how to navigate and understand it.

In another example, a user profile microservice can be used to manage a user profile for users of the network of nodes. For example, each user can have a profile that includes user specific information, such as an organization affiliation. The user profile microservice can call one or more functions of the CRUD microservices to access, create, or update user profile information stored in data storage 708. For example, the following represents a subset of functions that can be provided by a user profile microservice:

Create
  Standard create based on CRUD microservices
Read
  Standard read based on CRUD microservices
Update
  Standard update based on CRUD microservices
Update Create
  Standard update create based on CRUD microservices In another example, an ingredients microservice can be used to interface with the ingredients information stored in data storage 708. A subset of the functionality for an ingredients microservice is as follows:

Definitions:
  Meta Data Definition
    Ingredients
      As provided by RdbmsStandardAttributes
    Ingredients_CRUD
      As provided by RdbmsStandardAttributes
  Dynamic Data Definition
    Ingredients
      Reads Caption, ParentProductId and OwnerOrgId
    Ingredients_CRUD
      As provided by RdbmsStandardAttributes
Functionality:
  The standard CRUD operations are implemented as follows:
  Read
    Implemented as part of CrudBase using the Ingredients data stream.
  Delete Overridden using the Ingredients_CRUD data stream.
CreateItemsEx (Long ownerOrgId, Long parentProductId, IDynamicDataRecordSet items) throws ORSCN_ServiceException
    Iterate through the items list and set the OwnerOrgId and parentProductId
    Invoke the repository create using the Ingredient_CRUD data stream.
UpdateCreateEx(Long ownerOrgId, Long parentProductId, IDynamicDataRecord item) throws ORSCN_ServiceException
    Set the OwnerOrgId and parentProductId
    Invoke the repository updateCreate using the Ingredient_CRUD data stream.
ReadIngredient(Long ingredientId) throws ORSCN_ServiceException
    Invoke the static readIngredient on the Ingredient entity
        if ingredientId is null the null is returned
            Invoke the repository read using the ingredients_CRUD data stream filtering on the ingredientId.
                If an ingredient is returned expand the supplier information by invoking a read on the repository using the IngredientSuppliersCaptions data stream and replace the supplierIds attribute.
Update
Not implemented, exception thrown.
Create
Not implemented, exception thrown.
Create/Update
Not implemented, exception thrown.

In another example, a similar recipe microservice can be used to interface with the recipe information stored in data storage 708. A subset of the functionality for a recipe microservice is as follows:
Definitions:
    Meta Data Definition
        Recipes
            As provided by RdbmsStandardAttributes
        Recipes_CRUD
            As provided by RdbmsStandardAttributes
    Dynamic Data Definition
        Recipes
            Reads Caption, ParentProductId and OwnerOrgId
        Recipes_CRUD
            As provided by RdbmsStandardAttributes
Functionality:
The standard CRUD operations are implemented as follows:
Read
Implemented as part of CrudBase using the Recipes data stream.
Delete
Overridden using the Recipes_CRUD data stream.
CreateItemsEx (Long ownerOrgId, Long parentProductId, IDynamicDataRecordSet items) throws ORSCN_ServiceException
    Iterate through the items list and set the OwnerOrgId and parentProductId
    Invoke the repository create using the Recipes_CRUD data stream.
UpdateCreateEx(Long ownerOrgId, Long parentProductId, IDynamicDataRecord item) throws ORSCN_ServiceException
    Set the OwnerOrgId and parentProductId
    Invoke the repository updateCreate using the Recipes_CRUD data stream.
ReadRecipe(Long recipeId) throws ORSCN_ServiceException
    Invoke the static readRecipe on the Recipe entity
        if recipeId is null then null is returned
            Invoke the repository read using the Recipes_CRUD data stream filtering on the recipeId.
                If a recipe is returned expand the consumer information by invoking a read on the repository using the RecipeConsumersCaptions data stream and replace the consumerIds attribute.
                If a recipe is returned expand the ingredients information by invoking a read on the repository using the RecipeIngredientsCaptions data stream and replace the ingredientIds attribute.
Update
Not implemented, exception thrown.
Create
Not implemented, exception thrown.
Create/Update
Not implemented, exception thrown.

As previously described, example microservices can be stateless in embodiments, thus greatly simplifying their interactions with one another. In some embodiments, a session state microservice is provided to allow access to a Distributed Object Model ("DOM") object that is held on an application session. In an example, a simplified API for a session state microservice is the following interface: sessionDOM GetSessionDOM( ), which can return an object that provides the session DOM.

In an embodiment, a DOM object can be a data structure that gathers a miscellaneous set of data which represents the state of the user's session logged into the network. The data can be frequently accessed data (e.g., security rules) which are accumulated on demand or are a set of discrete items relating to the user that is logged in (e.g., current user, language choice, user's origination, current network visualization report, and the like). In accordance with the microservice architecture, embodiments include a single service to read and update the data in the DOM. This service can be used by the network application logic when data is requested from the DOM. In some embodiments, data in the DOM can be physically anchored to the session state (e.g., maintained by an application server).

As described herein, drip fed delta processing for the network maintains a network configuration for a given organization/entity/node (e.g., direct access vector for a given node) that can be readily used to query data storage 708 to traverse a graph that represents the network of nodes (e.g., identify existing or potential paths/supply chains that include the given node). An example network traversal microservice can be provided that is used to traverse the network to return paths for an organization (e.g., entity or node in the network). A subset of the functionality for an example network traversal microservice is as follows:

Data Layout
Simple 4 column table (connectionId, to, from, type) with one row per connection. The inverse connection is not stored.
Given nodes X and Y, where type c = consumes and s = supplies

```
X c Y    (X Consumes Y)
And
   Y s X    (Y Supplies X)
Are equivalent.
Objects
Network
    IDDRS<Organisations> organisations
    List<Connection> connections
Connections
    Long formNodeId
    Long toNodeId
    Enum connectionType
API
public Network readNetwork(Int startOrganisationId, int depth)
```

In some embodiments, a network traversal microservice can return network paths (e.g., a supply chain) for the organization of the requesting user. For example, the data returned can represent such paths as pairs of organizations (e.g., identified by IDs) in addition to the nature of the relationship that connects these organizations (e.g., trading partners, suppliers, customer, and the like). In some embodiments, this service can be used to display and search an organization's supply chain.

The organizations representing the supply chain (returned by this service) can be defined by the connections and goods or products traded between them. In some embodiments, in order to deliver a list of connected nodes, the microservice utilizes information about the connections accepted and the products traded, though in some implementations this information is used but not returned. For example, in some implementations the resulting set of organizations representing the supply chain is returned, but not the noted additional information used to determine the result set.

As further detailed with references to FIGS. 8-14, visualizations can be displayed to users of the network system which can, in some instances, include a visualization of data secured using the security policies of the network system, such as a visualization of a path of nodes/entities that represents a supply chain. An example visualization microservice can be provided that is used to create, edit, or update visualizations for the network system. A subset of the functionality for a visualization microservice is as follows:

Functionality:
  Create
    Ensures all required properties are provided
    Creates a new visualisation.
  Read
    Reads the current visualisations for the current organisation. Retrieving the visualisations in this way returns everything needed to create the visualisation, minus the actual data. This can be used to retrieve and edit a visualisations specification without needing to read all the network data.
  Read Visualisation Data
    This operation will read the visualisations including the actual network data needed for the UI to display.
  Update
    Updates a visualisation with the provided data
  Delete
    Removes a virtualisation from the DOM
A visualisation can be defined as follows:

| Attribute | Notes |
|---|---|
| Id | A generated Integer, mandatory Id |
| Type | One of, PieChart, BarChart NetworkGraph, WorldMap or Table. Mandatory |
| Title | A friendly name for the visualisation. Used for display. Mandatory |
| Filter | A filter that describes what to include or exclude from the data used in the visualisation. This is created through the UI. |
| Options | A data record containing options specific to the type of the visualisation, Currently only the pie/bar chart use this for a 'data attribute' in order to display correctly. |
| Data | The data required to display the visualisation. This is looked up when needed via the read visualisation data operation. |

Creation
Creating a visualisation requires mandatory attributes to be provided, otherwise an exception will be thrown. Once created a visualisation can be edited. A visualisations data is looked up via a connection service before it is displayed. At this time, the options and filter are taken into account.
Editing
Any attributes can be edited except the ID. Changing the visualisation attributes may require data to be re-read in order for changes to take affect. (For example, options or filter changes).

Referring back to FIG. 7, services 702, data platform 704, security platform 706, and data storage 708 can be configured to allow information sharing among the entity/nodes/organizations in the network. The network system is based on fluid sharing of data rather than silos of private data, even in instances where some of this data is confidential or sensitive. Accordingly, the network data can be shared among the nodes/entities/organizations according to sharing rules that are based on the relationships between the node/entity/organization requesting access to the data and the node/entity/organization that owns the data record being requested.

An example sharing rule for a given node/entity/organization is: a data record (e.g., row of a table) owned by the given entity allows access to any entities where an existing flow of a good or product exists with the given entity (e.g., the entities are trading partners or on a supply chain path) and does not allow access to entities that do not have such an existing flow of a good or product. In other words, the given entity may allow trading partners to access certain data that non-trading partners cannot access. Different network sharing rules can be defined for different groups of field data (e.g., columns) within the same record (e.g., row). In some embodiments, sharing rules can be defined for individual users for each distinct functional area of the network system.

As detailed herein, an entity of the node network can be an organization, and data storage 708 can store a profile information for the organization. For example, a profile can be stored for registered organizations that can include one or more of a name, address or location (e.g., latitude, longitude, home country, and any other suitable location information), brands associated with the organization, a homepage Uniform Resource Locator ("URL"), social media accounts for the organization, a combination of these, and other suitable information.

In an embodiment, the network of nodes can represent a network of suppliers, customers, and/or intermediaries. In such an example, an organization profile can also include one or more of products sold, products purchased, certificates from third party associations, expired certificates form third party associations, direct suppliers (e.g., from among the other entities in the network), direct customers (e.g., from among the other entities in the network), plans for good or products (e.g., recipes), parts for goods or products (e.g., ingredients), a combination of these, and any other suitable information for a buyer or seller of products or goods.

In embodiments that include social aspects for the network nodes (e.g., posts, messages, and the like), the system can manage social data for entities, such as messages, posts, discussion groups, and data for other social interactions. In addition, the entities further include network data related to their orientation in the network, such as connections between entities/nodes, paths with entities/nodes (e.g., direct access vector), and other suitable information related to the entity/node's orientation in the network.

In some embodiments, an entity can define specific sharing rules for individual pieces of data owned by the entity (e.g., different data items related to an organization profile, social network data, network orientation data, and the like). For example, a portion of an organization's profile can have a public sharing rule (e.g., available to anyone) while certificates or expired certifications may have a direct trading relationship sharing rules (e.g., only available to trading partners). Example sharing rules are:

Public—Data is available to anyone on the internet.
Network—Data is available to anyone registered user/organization. Anyone with a user account that can login to the system.
Direct Trading Connections—Data is available to users within an organization that the source organization has a direct trading relationship with. They either supply, consume or both supply and consume directly with the source organization.
Customer Connections—Data is available to users within an organization that is a customer of the source organization.
Supplier Connections—Data is available to users within an organization that is a supplier of the source organization.
Potential Connections—Data is available to users within an organization that the source organization has a potential connection with (e.g., potential flow of goods or products) based on matches between organization owned ingredients and recipes (as detailed herein).
Specific Organizations—Data is available to anyone from within a specific list of organizations. The organizations can be selected from all organizations on the network.
Private—Data is only available to users within the organization that owns the data.

In some embodiments, security platform 706 makes access permission decisions based on these sharing rules (e.g., stored as access permissions) for each source entity and the relationship between the source entity and the user requesting the source entity's data. The relationship between entities/organizations can be stored as network data. In some examples, this relationship can be defined by which invitations have been sent and accepted to indicate a trading relationship. For example, a customer 'X' may request an organization 'Y' to connect to them as a supplier. If this invitation is accepted, supplier 'Y' would have visibility for data which the owner 'X' has marked as 'only visible to suppliers'.

In some embodiments, upon resolving the data sharing rules and determining whether a user's permission to retrieve data owned by a source entity, relational filtering 718 augments a data query (e.g., SQL query) submitted on behalf of an authenticated user (via services 702 and data platform 704) with a "key" to retrieve the data from data storage 708. The augmented query can then be executed at data storage 708 to retrieve the requested data. In some embodiments, where data store 718 determines the user is not permitted to access requested data, the relevant "key" for the data will not be added to the query, and thus the data will not be returned when the query is performed at data store 718.

In some embodiments, the security platform 706 access the "Current logged in Organization ID". This can be stored immutably within the trusted store 720, by the login process, based on the organization associated with the authenticated user. Tables within data storage 708 that contain sensitive information (e.g., information secured by one of the above security policies/sharing rules) can have their records keyed by the Organization ID of the entity/organization who is deemed to "own" the record. As disclosed above, each entity/organization can grant access to individual organizations or to "classes of organizations" related to them in a specific way based on specific sharing rules/access permissions (e.g., customer, supplier, and the like).

In some embodiments, the tables that store network data in data storage 708 have an associated "Security Descriptor," or an XML representation of rules which show how the organization requesting access to the data must relate to owner of the data row (if the row to be accessible). For example, the XML can define sharing rules/access permissions for records of the associated data table. The security platform 706 uses the XML relationship rules and the "current logged in organization ID" to determine the set of possible other organizations whose data could be accessed.

In some embodiments, relational filtering 718 modifies SQL access statements such that an additional WHERE clause modifier is added to any filtering already specified in the SQL (e.g., by data platform 704). This additional restrictor can list the set of valid organization IDs (e.g., according to the current logged in organization ID and the XML security descriptors), one of which must be present in a data row's organization key for the record to be matched and included within the scope of the query.

In some embodiments, after SQL results are received, but before it is returned to the calling application data reduction can be performed by data redaction 716. For example, the WHERE key modification process will have restricted the rows accessed by the SQL, but various fields of these rows will have been read without considering security protocols. In some instances, a data owner may have permitted access to the record but not to all the fields within the record. Data redaction 716 can be used to handle such a scenario and redact column level data.

In some embodiments, each record returned is post-processed by data redaction 716 to remove any field data not authorized as being accessible to the current organization by the data owner. In some embodiments, the rowset (e.g., returned data set) will be returned only after key filtering and redaction.

As an example, a requesting organization/application/microservice can attempt to read a table using an unrestricted "*" SQL where clause. The security platform 706 can then identify the requester using "the current logged in Org ID" from trusted store 720. Security platform 706 can then compute the set of other organizations who have granted access to this organization. Relational filtering 718 can add additional WHERE modifiers to the SQL to filter out data owned by organizations not granting this access. Thus, retrieval from such an unrestricted SQL statement would return a much more secure record set due to the added WHERE modifiers.

In some embodiments, data redaction 716 can then analyze the retrieved data to remove any fields that the record's owning organization has not permitted the requester to view. For example, for each record, security protocols (e.g., access permissions/data sharing rules/a security descriptor file) can be accessed to determine the column level access the requesting organization has relative to the owner of the record. When the requesting organization is determined to not have column level access to data, the data can be removed from the result set. The relational filtered and redacted data can then be returned to the requesting organization. In some embodiments, this could be an empty set of records.

The following represents example XML that define access permissions used by security platform 706 to perform the above-noted security functions:

```
<?xml version="1.0"?>
<!-- An organization has access to any requests that it created (CREATED ORG ID) or
any requests that are directed at it (TARGET ORG ID) that are not for a user. A user
has access to any requests for any organization that it is a member of
(@SecureAvailableOrganisations) or that are for that user. There is no access to delete
records Only Status ID, Updated Date and Time, Updated Org ID and Updated User Id
can be updated -->
<SecurityDefinition id="Rdbms INVITE STREAM"><DataSources><Rdbms
id="InviteStreamDataSource" allowedOperations="Create,Read"
source="INVITE STREAM"><Fields><Field
writeValue="@'SecureSelectedOrganisationId'" sourceName="CREATED ORG ID"
logicalName="CreatedOrgId"/><Field sourceName="TARGET ORG ID"
logicalName="TargetOrgId"/><Field sourceName="TARGET USER ID"
logicalName="TargetUsrId"/><Field allowedOperations="Create,Read,Update"
writeValue="@CurrentDateTime" sourceName="UPDATED DATETIME"
logicalName="UpdDateTime"/><Field allowedOperations="Create,Read,Update"
writeValue="@'SecureSelectedOrganisationId'" sourceName="UPDATED ORG ID"
logicalName="UpdatedOrgId"/><Field allowedOperations="Create,Read,Update"
sourceName="STATUS ID" logicalName="StatusId"/><Field
allowedOperations="Create,Read,Update" sourceName="CODE"
logicalName="Code"/></Fields></Rdbms> </DataSources><Transforms><Filter
id="FilteredRequestStreamTransform"
input="InviteStreamDataSource"><Clauses><Or><LeftClause><Clause
rightValue="@'SecureAvailableOrganisationsIds'" relation="="
leftValue="CreatedOrgId"/></LeftClause><RightClause><Or><LeftClause><And><Left
Clause><Clause rightValue="@'SecureAvailableOrganisationIds'" relation="="
leftValue="TargetOrgId"/></LeftClause><RightClause><Clause rightValue="NULL"
relation="="
leftValue="TargetUsrId"/></RightClause></And></LeftClause><RightClause><Clause
rightValue="@'SecureUserId'" relation="="
leftValue="TargetUsrId"/></RightClause></Or></RightClause></Or></Clauses></Filter>
</Transforms></SecurityDefinition>
<?xml version="1.0"?>
<SecurityConfiguration><Entity defaultSourcePrefix="ORG"
knownEntity="Organisation"><Attributes><Attribute
logicalName="ProductsPurchased"><Storage><Rdbms
source="ORG PRODUCTS PURCHASED/ORG ID"/><Rdbms
source="ORG PRODUCTS PURCHASED/PRODUCT ID"/></Storage></Attribute><
Attribute logicalName="ProductsSold"><Storage><Rbdms
source="ORG PRODUCTS SOLD/ORG ID"/><Rbdms
source="ORG PRODUCTS SOLD/PRODUCT ID"/></Storage></Attribute></Attributes
></Entity><AttributeGroup name="OrganisationProductsTraded"><Attributes><Attribute
id="Organisation/ProductsPurchased"/><Attribute
id="Organisation/ProductsSold"/></Attributes></AttributeGroup><DataEntry
caption=" TRANS View Products Traded" globalDefaultRule="Network"
attributeGroupName="OrganisationProductsTraded"><Verbs><Verb
name="Read"/></Verbs></DataEntry></SecurityConfiguration>
```

In some embodiments, user based functional security rules control 'who' can do 'what' within a source organization. They can also control who has what access to the underlying source organization data. Security templates are used to define what functional security a user has at the point they are created. An administrator (user with sufficient privileges) can control by functional security setting if it is granted to or revoked from a given user within their organization. The available security templates and their associated privileges are shown at Tables 1 and 2, below. For example, three templates can be considered: Admin—a user that is able to fully administer the organization, including managing users, connections, and all data belonging to their organization; User Editor—a user that can contribute by making social posts, managing the corporate profile, and the like, but is not able to do security related operations such as managing users, connection, and the like; User Reader—a user that is only able to view and analyze information. They are not able to make any changes. In general, this user is a read only user.

TABLE 1

| | Access by Security Template | | |
|---|---|---|---|
| Function | Admin | Editor | Reader |
| Organization Profile | | | |
| Update Public Information | ✓ | ✓ | x |
| Update Products Traded | ✓ | ✓ | x |
| Update Accreditations and Certificates | ✓ | ✓ | x |
| Update Location | ✓ | ✓ | x |
| Update Contacts | ✓ | ✓ | x |
| Update Preferences | ✓ | x | x |
| Update PIN | ✓ | x | x |
| Posts | | | |
| Manage Discussion Group Subscriptions | ✓ | ✓ | x |
| Update Posts | ✓ | ✓ | x |
| Security | | | |
| Manage Data Visibility Security | ✓ | x | x |
| Manage Features and Functions Security | ✓ | x | x |
| View Audit | ✓ | x | x |

TABLE 2

| | Access by Security Template | | |
|---|---|---|---|
| Function | Admin | User-Editor | User-Reader |
| Invitations | | | |
| Manage Connections | ✓ | x | x |
| Manage Organization Links | ✓ | x | x |
| Manage Users | ✓ | x | x |
| View Notifications | ✓ | ✓ | x |
| View Connections | ✓ | ✓ | ✓ |
| View Linked Organizations | ✓ | ✓ | ✓ |
| View Users | ✓ | ✓ | ✓ |
| Network | | | |
| Use Reporting and Visualization Tools | ✓ | ✓ | ✓ |
| Browse Organizations | ✓ | ✓ | ✓ |
| Raw Materials | | | |
| Update Raw Materials and Product Lines | ✓ | x | x |
| View Raw Materials and Product Lines | ✓ | ✓ | ✓ |

Figure 8:
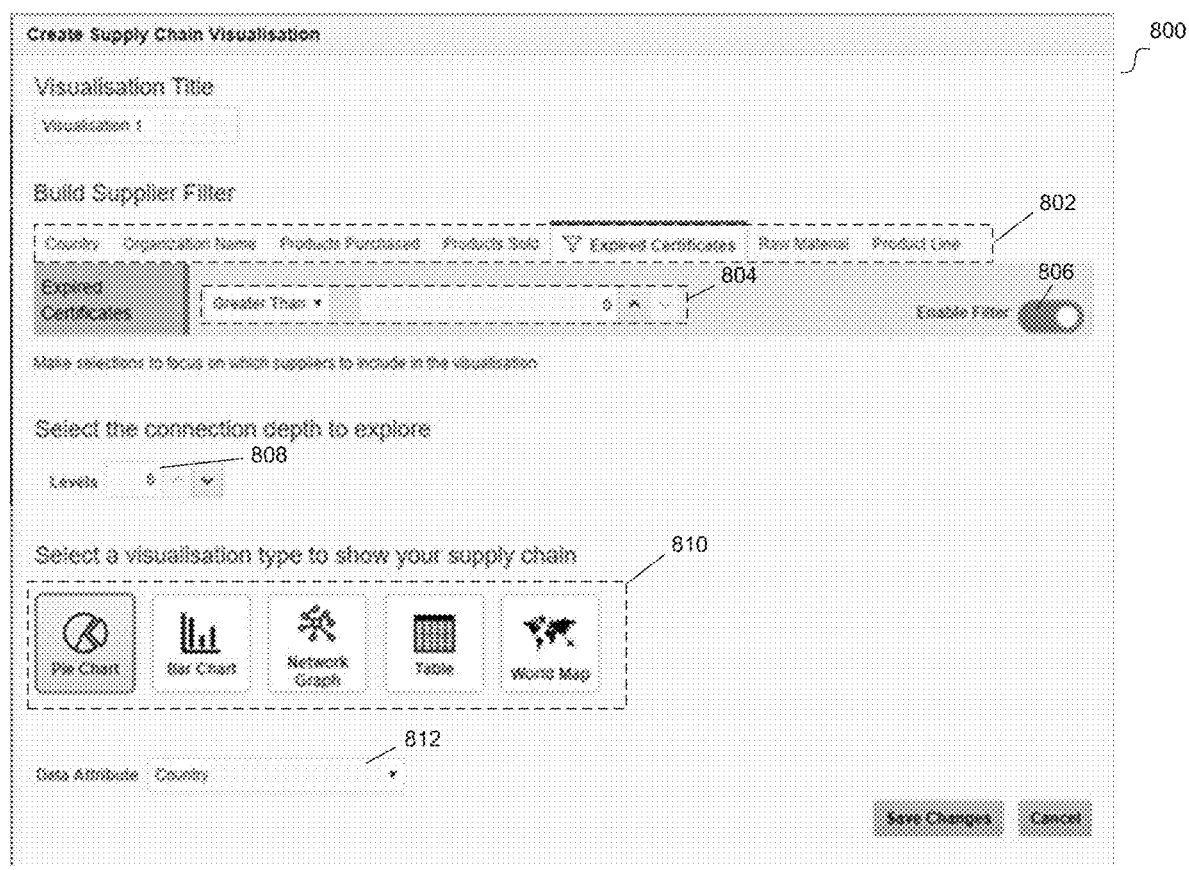
FIG. 8 illustrates an example graphical user interface for configuring a view of a network of nodes according to an example embodiment.

In some embodiments, the data retrieved from the social network can be used for various functional purposes. For example, one or more visualizations can be generated that illustrate an organization's orientation in a path (e.g., supply chain). FIG. 8 illustrates an example graphical user interface for configuring a view of a network of nodes according to an example embodiment. For example, a user within an organization may operate a client device that is configured to display dashboard 800 for displaying a supply chain visualization. Network data retrieved to generate visualization can leverage one or more functions disclosed. For example, a visualization can be generated based on a retrieved vector (e.g., direct access vector) for a given node from a pre-compute version of stored network data. The retrieved network data can also be secured using the relational filtering and data redaction functionality that manage storage security policies relative to a given node.

In some embodiments, dashboard 800 can include user interface elements (e.g., widgets) that include filter options 802, configuration options 804, enable 806, depth 808, visualization options 810, and attribute 812. For example, filter option 802 can be used to determine a type of filter for the organization data to be displayed by the visualization. The illustrated options include a country filter, an organization name filter, a products purchased filter, a products sold filter, an expired certificates filter, a raw materials filter (e.g., ingredients), and a product line filter.

FIG. 8 illustrates an example where "expired certificates" is the selected filter. Configuration options 804 can allow for configuration of the selected filter. In the illustrated embodiment, the filter is configured to display entities in a supply chain that have greater than "0" expired certificates. Enable 806 allows a user to enable or disable the filter.

Figure 9:
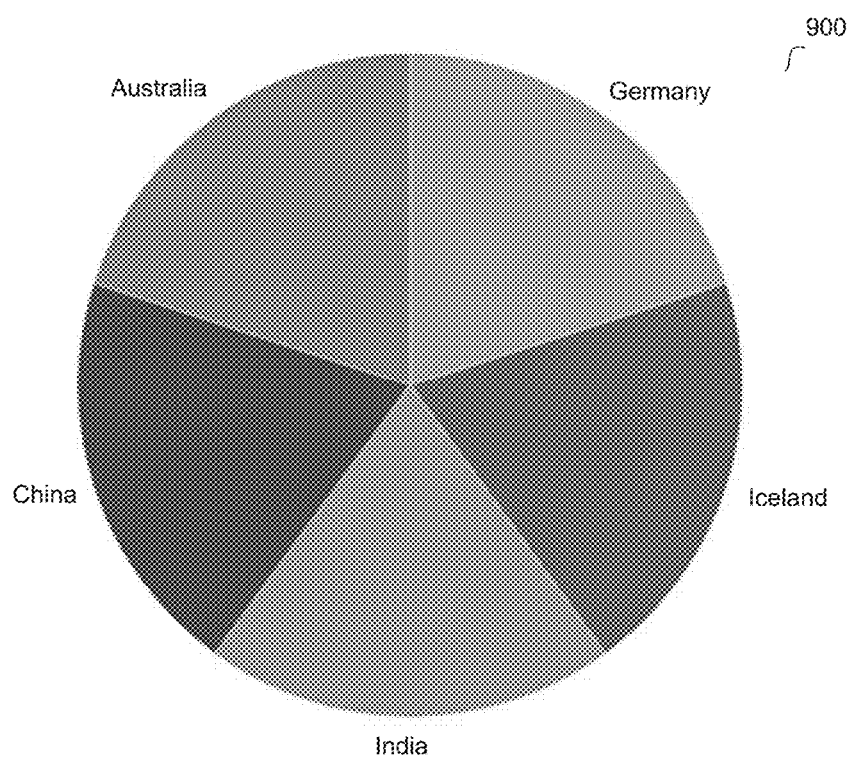
FIG. 9 illustrates a pie chart view of network data according to an example embodiment.
Figure 11:
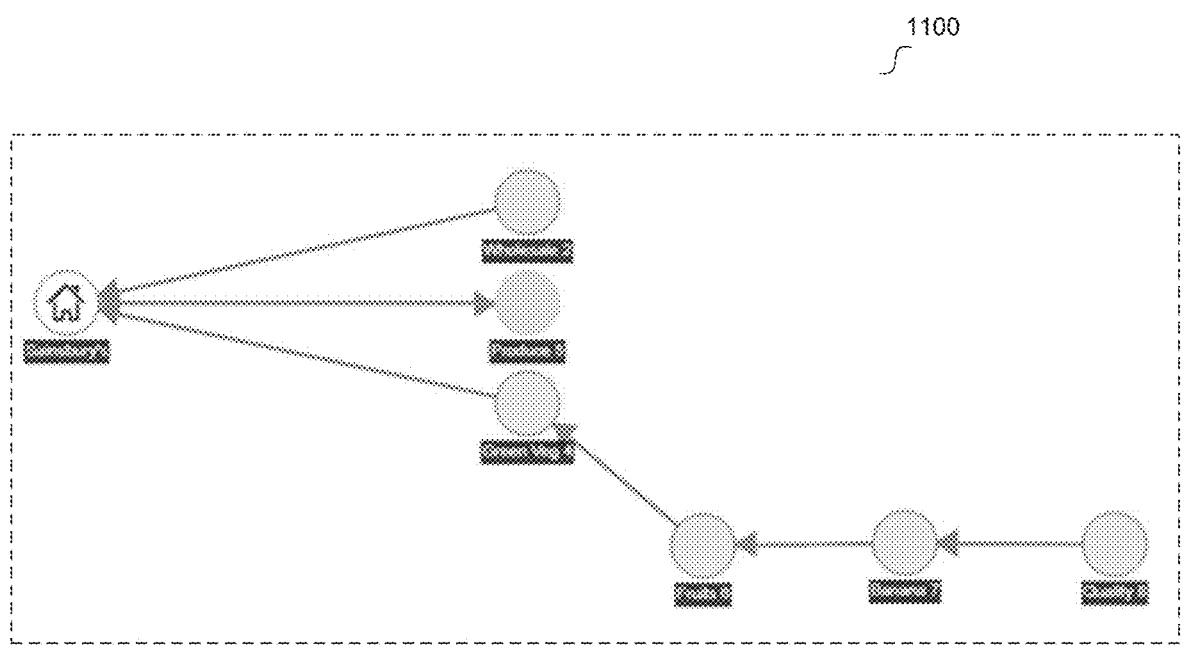
FIG. 11 illustrates a network graph view of network data according to an example embodiment.
Figure 12:
FIG. 12 illustrates a world view of a supply chain according to an example embodiment.
Figure 13:
FIG. 13 illustrates another world view of a supply chain data according to an example embodiment.
Figure 14:
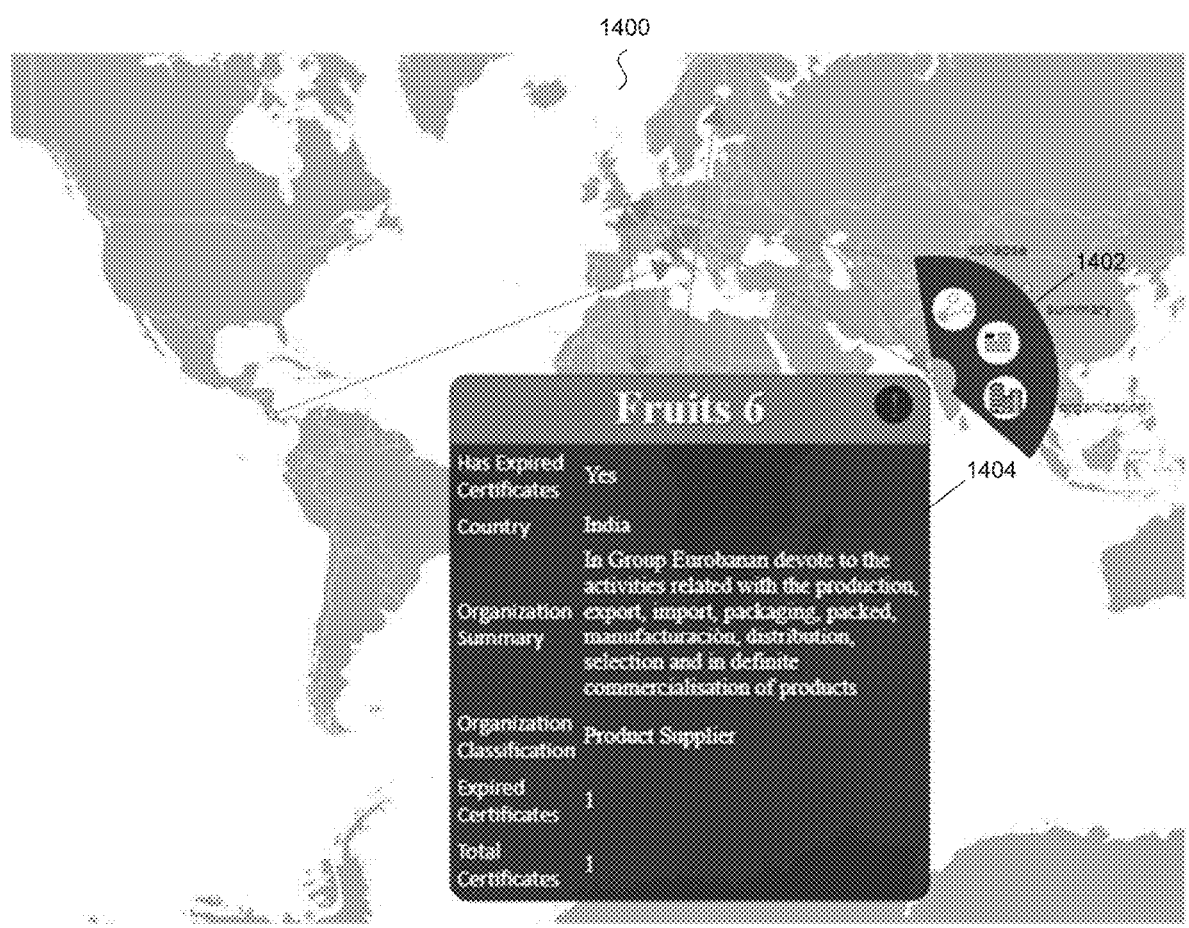
FIG. 14 illustrates another world view of a supply chain according to an example embodiment.

Depth 808 can allow a user to select a depth of the supply chain (e.g., display nodes/entities/organizations with a distance less than or equal to the selected depth, where distance is the number of jumps or hops away from the source node/entity/organization in the network). Visualization option 810 allows a user to select a visualization type, such as pie chart, bar chart, network graph, table, or world map. FIG. 9 illustrates a pie chart visualization of network data according to an example embodiment. FIG. 10 illustrates a table visualization of network data according to an example embodiment. FIG. 11 illustrates a network graph visualization of network data according to an example embodiment. FIGS. 12-14 illustrate world view visualizations of a supply chain data according to an example embodiment.

Data attribute 812 allows a user to select a data attribute used by some visualizations. For example, pie chart 900 of FIG. 9 illustrates a pie chart segmented by country. If a user desires to have a wider view of the data for the supply chain visualization, data table 1000 of FIG. 10 provides a larger cross-section of the network data. Network graph 1100 of FIG. 11 depicts a visualization of the network nodes and connections between these network nodes that displays the various links that are included in the supply chain.

World view visualization 1200 of FIG. 12 depicts the supply chain connections overlaid on a world map. In this example, a user is shown the various regional risks in a supply chain. A user can further request more granular information about the links in the supply chain by selecting (e.g., clicking or tapping) one of the points in the supply chain. World view visualization 1300 of FIG. 13 includes widget 1302, summary 1304, and indicator 1306 that are displayed upon a selection of a link in the supply chain.

Widget 1302 can be used to select organization information for display. Summary 1304 provides a summary of the selected organization, including a number of expired certificates (e.g., the filter used to generate the depicted visualization). Indicator 1306 can indicate a condition for the particular filter used to generate the visualization. In the illustrated embodiment, indicator 1306 shows a red exclamation point because the selected organization has expired certificates. In some examples, a green check may be displayed if the organization has no expired certificates. Visualization 1400 of FIG. 4 similarly includes widget 1402 and summary 1404 that display the summary of a different organization in the supply chain.

The various embodiments disclosed have a number of advantages over conventional data management and security applications. For example, embodiments that include drip fed delta processing and pre-computed version of network data can substantially reduce the computational complexity associated with traversing a large graph of nodes. At least the generated direct access vector provides an efficient solution to querying a relational database to quickly and accurately retrieve network data. Such efficiency and high accessibility allow for robust software service offerings from the network system, such as the visualizations disclosed herein. The more cumbersome, less efficient, and computationally challenging approaches taken by conventional data management systems fail to achieve these benefits.

For example, some data schema implementations are designed to represent and answer questions on connection graph networks. However, many of these are optimized for frequent reads and occasional updates. In the various embodiments, the network can, at times, be subject to frequent updates as new relationship connections and traded good or products are added/updated across the participating organizations. The disclosed drip fed delta processing provides technical advantages in such an environment.

Another alternative can be a simple on-demand recursion of a relational network connections table. Conventional approaches that leverage such a simple system can process frequent updates, yet traversing a graph represented by the stored data can be computationally challenging. The drip fed delta processing solution and pre-computed version of network data can provide efficient traversal even in the presence of frequent updates, which generates performance benefits over these conventional techniques.

In addition, embodiments that include the trusted store and data security policies ensure that the network of nodes can store and share private, sensitive, or confidential data among different organizations in a supply chain or, in some instances, potential organizations that may be added to a supply chain. In particular, the funneling of data requests through the security sub-system, and the relational filtering and data redaction achieved by the security sub-system and trusted store ensures that no user or organization is provided access to data that they do not have permission to view, update, or delete.

For example, traditional role-based security mechanisms often assume that data access is granted using a fixed list of users or user groups who are to receive access. Embodiments provide access based on a "relationship between data owner and data consumer". For example, when access to a piece of data is granted for an organization's "customers," the organizations that fall into the "customers" category can change fluidly as trading relationships are updated, and thus the organizations granted access to the piece of data can change fluidly. Embodiments provide a permissions policy that can efficiently and effectively secure data retrieval in the presence of such changes. In addition, traditional security is also often record key based. Embodiments include a finer granularity, where security is set on each field of a record independently.

Figure 15:
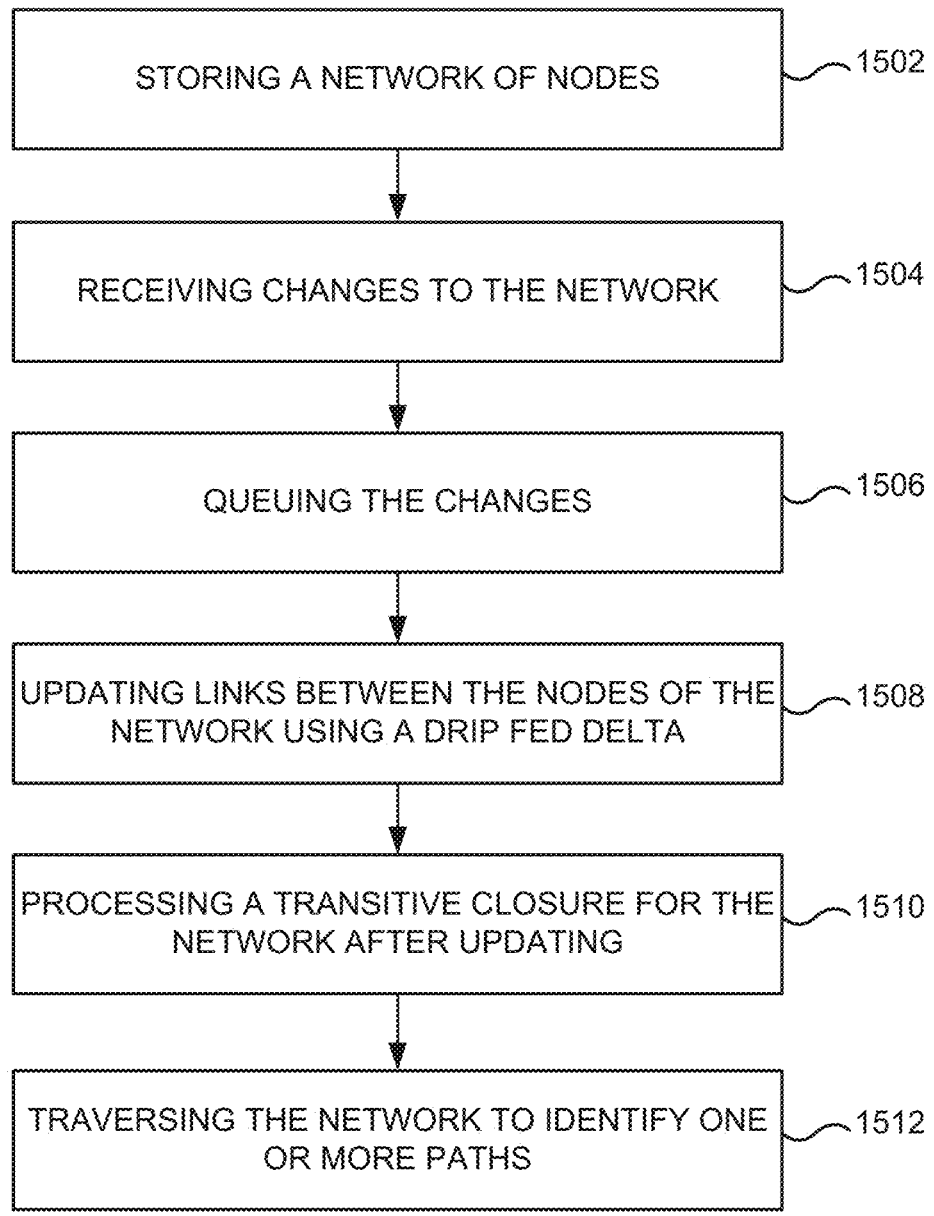
FIG. 15 illustrates an example method for managing a network of nodes with delta processing according to an example embodiment.

FIG. 15 illustrates an example method for managing a network of nodes with delta processing according to an example embodiment. In one embodiment, the functionality of FIGS. 15 and 16 below is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 1502, a network with a plurality of connected nodes is stored, the nodes representing entities of the network. For example, the network of connected nodes can be mapped onto relational data tables.

At 1504, one or more deltas to the network can be received that indicate updates to the connections among the plurality of nodes. For example, an update to network information can be received from an authenticated user associated with an entity of the network, and one or more deltas can be generated based on the update. At 1506, the deltas can be added to a queue. At 1508, the connections between the nodes of the network can be updated using deltas from the queue. For example, the queue can be a FIFO queue, and the delta on the top of the queue can be processed to update the network.

At 1510, the network can be processed after updating the connections between the nodes to generate a vector for a given node. For example, a transitive closure for the network can be determined after updating the network and the transitive closure can be used to generate a direct access vector for each node in the network.

In some embodiments, drip fed delta processing can include storing a pre-computed version of the network data in a set of relational data tables. This pre-computed version can provide efficient traversal of the network, for example based on the pre-computed network data stored in the data tables. In some embodiments, processing the network can include updating data in one or more of the data tables that store the pre-computed version of the network data. In some embodiments, the pre-computed version of the network data provides direct access vectors for nodes of the network that can be retrieved by querying the data tables. The direct access vector can indicate connected nodes that include a connection with the given node and indirect nodes that are part of a path that includes the given node and at least one connected node.

At 1512, one or more paths for the given node can be identified based on the generated vector. For example, the relational data tables can be queried using the direct access vector to return path information for a given node.

Figure 16:
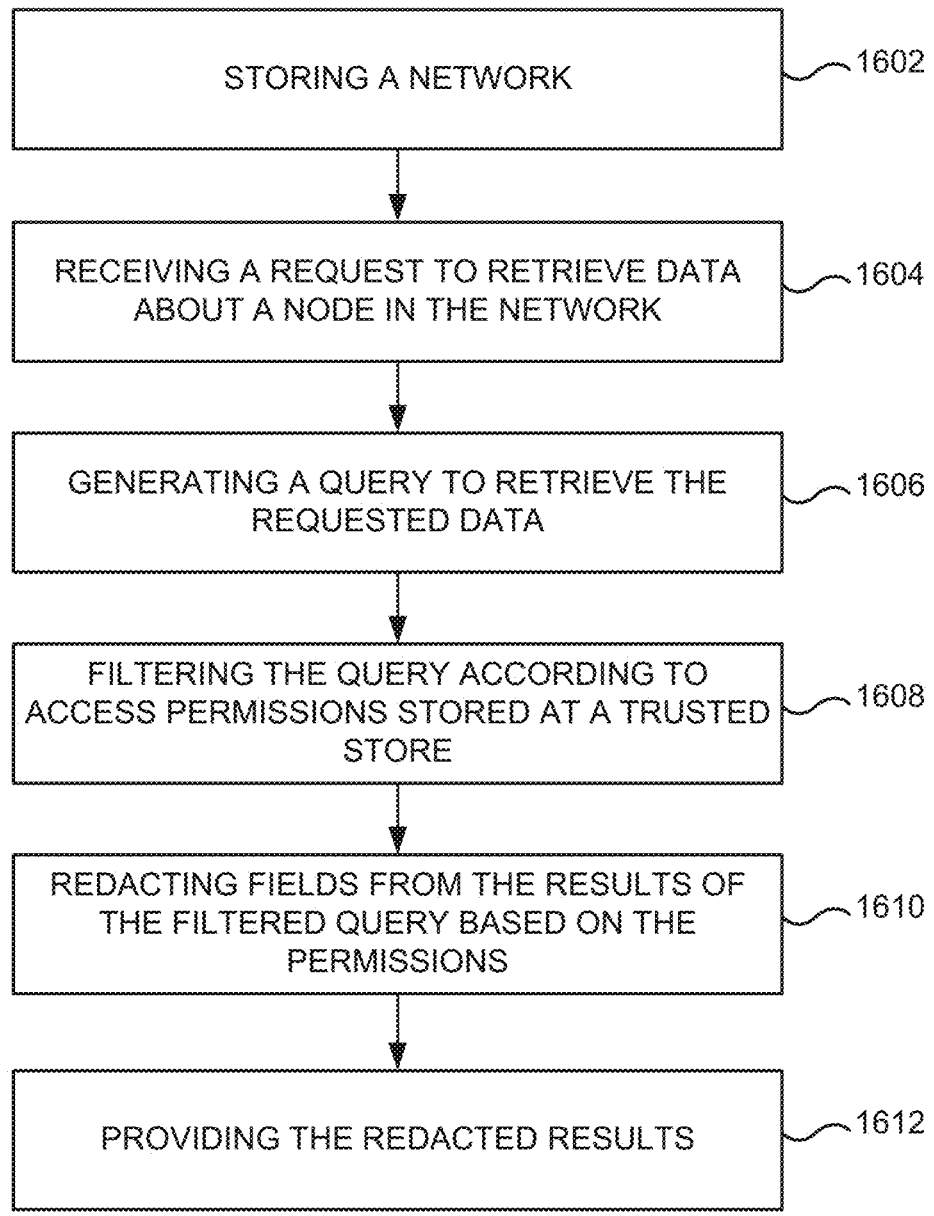
FIG. 16 illustrates an example method for providing secure data management for a network of nodes according to an example embodiment.

FIG. 16 illustrates an example method for providing secure data management for a network of nodes according to an example embodiment. At 1602, a network with a plurality of connected nodes is stored, the nodes representing entities of the network. For example, the network of connected nodes can be mapped onto relational data tables.

At 1604, a request can be received from a first node to retrieve data about a second node of the network. For example, a request can be received from an authorized user of an entity represented by the first node. At 1606, a query can be generated to retrieve the requested data.

At 1608, the query can be filtered based on permissions for the first node stored at a trusted store. For example, the query can be augmented with a key used to retrieve the requested data based on permissions for the first node relative to the second node stored at the trusted store.

In some embodiments, a permissions file is stored that defines access to one or more of the relational data tables, the access permissions being defined per record in the relational data tables based on an owner node that owns a record and a relationship between the owner node and the node requesting access. The trusted store can immutably store a plurality of keys for nodes of the network. In some embodiments, filtering the query based on permissions for the first node stored at a trusted store includes accessing the permissions file to retrieve a list of keys from the trusted store, where the list of keys is for a subset of nodes that are permitted for access by the first node according to the relationship between the first node and the subset of nodes. Augmenting the query can include adding the list of keys to the query, where secured records within the relational data tables requested by the query are retrieved when the list of keys includes a key that corresponds to the secured records.

At 1610, fields from the results of the filtered query can be redacted based on the permissions for the first node. For example, the permission file can be accessed to determine what access permissions the first node has relative to the owners of the returned records. Any column level data that the first node is determined not to have access to can be deleted before returning the query results. At 1612, the redacted results can be provided to the first node.

Embodiments manage data processing for a network of nodes. An example network can include a plurality of nodes with a plurality of connections among the nodes. In some embodiments, the network can be a social network with various degrees of information sharing. At times, new connections can be generated between two previously unconnected nodes or a connection can be severed between previously connected nodes. One or more paths can be identified based on the current configuration (e.g., current connections among the nodes) of the network. For example, a path can start at a first node and progress through second, third, and fourth nodes before terminating at a fifth node. Such an identified path can be useful for identifying patterns, trends, or risks, performing predictions, or for other analytical purposes (i.e., depending on the nodes within the network and the specific implementation).

However, the dynamic nature of these networks brings about risks and computing challenges. For example, social networks are often changing, building new nodes connections and tearing down old ones. Thus, path identification among the nodes can be computationally cumbersome. As further detailed herein, embodiments leverage drip fed delta processing to manage the network that achieves computational efficiency while maintaining dynamic update functionality for node connections.

In some embodiments, entities of the network (e.g., nodes) can have authorized users that interact with the system. For example, authorized users can edit a profile for the entity, send messages to other entities of the network, alter relationships with other entities, retrieve data related to the entities of the network, perform a network analysis, and other suitable functions. However, in some embodiments, confidential or sensitive information for one or more entities may be stored (e.g., in a data store) in association with the network. For example, in a social network, the system may store sensitive information for a first entity that can be shared with a subset of other entities, but cannot be shared with the remaining entities. In other examples, the sensitive information may be marked private, and thus may not be shared with any other entities of the social network.

In some embodiments, the system can provide secure data retrieval for entities of the network. For example, a security sub-system can maintain one or more permissions for the authorized user that determines what information the user can retrieve. Based on the security sub-system, a data retrieval request can be filtered to ensure the authorized user is only provided with information according to the established permissions. For example, relational filtering can be used to filter generated queries according to the permissions prior to performing a search on the data store. In another example, data redaction can be performed on the data retrieved by a query according to the permissions to redact data prior to providing it to the authorized user. The security sub-system, relational filtering, and data redaction can be used to ensure secure data management of sensitive or confidential data for entities of the network.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for managing a network of nodes that represent a supply chain, the method comprising:
   storing a network with a plurality of connected nodes, wherein,
   the connected nodes represent suppliers and customers,
   paths among the connected nodes represent supply chains for one or more products, and
   the paths among the connected nodes are dynamic based on interactions among the suppliers and customers;
   receiving, from an authenticated user of a first node of the network, a request to retrieve data about a second node of the network;
   generating a relational data query to retrieve the requested data from data tables of a secure database that stores the network, wherein the first node is connected by a plurality of paths with a subset of the connected nodes, each of the plurality of paths connects a plurality of the subset of connected nodes to the first node, and the authenticated user of the first node comprises access permissions to access data about the subset of the connected nodes; and
   providing, when the access permissions for the authenticated user of the first node permit access to data about the second node, data about the second node retrieved via the relational data query to the authenticated user of the first node, wherein
   the authenticated user of the first node is permitted access to data about the second node when the second node is among the subset of the connected nodes that are connected to the first node by the plurality of paths, the authenticated user of the first node is not permitted access to data about the second node when the second node is not among the subset of the connected nodes that are connected to the first node by the plurality of paths, and the provided data about the second node comprises supply chain information about a first product, and at least one path of the plurality of paths that connects the first node and the second node represents a first supply chain for the first product.

2. The method of claim 1, further comprising:
augmenting, based on access permissions for the first node stored at a trusted store, the relational data query with security parameters that provide record level access to the secure database.

3. The method of claim 2, wherein the security parameters used to augment the relational data query comprise one or more keys such that secured records within the data tables requested by the relational data query are retrieved when the one or more keys include a key that corresponds to the secured records, and the one or more keys used to augment the relational data query are based on at least permissions for the first node relative to the second node.

4. The method of claim 1, wherein the data tables of the secure database maintain a pre-computed version of the network that is configured to return the plurality of paths for the first node based on the relational data query.

5. The method of claim 4, wherein the pre-computed version of the network is maintained by queuing deltas that represent changes to the plurality of connected nodes and updating the data tables of the secure database by processing a queued delta.

6. The method of claim 4, wherein the network with the plurality of connected nodes comprises a social graph, and the pre-computed version of the network comprises the social graph mapped onto the data tables of the secure database.

7. The method of claim 4, wherein one or more parts and one or more plans that comprise a plurality of parts are defined for the plurality of connected nodes, and wherein a connection between two nodes of the network is based on a correspondence between a plan defined for a first of the two nodes that matches a part defined for a second of the two nodes.

8. The method of claim 7, wherein the pre-computed version of the network is maintained by determining a transitive closure for the network, and the transitive closure is determined using connections among the plurality of connected nodes based on a correspondence between plans and parts for the plurality of connected nodes.

9. The method of claim 1, wherein the supply chain information about the first product comprises a trade or product certification and an expiration status of the trade or product certification.

10. A non-transitory computer readable medium having instructions stored thereon that, when executed by a processor, cause the processor to manage a network of nodes that represent a supply chain, the managing comprising:
storing a network with a plurality of connected nodes, wherein,
the connected nodes represent suppliers and customers,
paths among the connected nodes represent supply chains for one or more products, and
the paths among the connected nodes are dynamic based on interactions among the suppliers and customers;

receiving, from an authenticated user of a first node of the network, a request to retrieve data about a second node of the network;
generating a relational data query to retrieve the requested data from data tables of a secure database that stores the network, wherein the first node is connected by a plurality of paths with a subset of the connected nodes, each of the plurality of paths connects a plurality of the subset of connected nodes to the first node, and the authenticated user of the first node comprises access permissions to access data about the subset of the connected nodes; and
providing, when the access permissions for the authenticated user of the first node permit access to data about the second node, data about the second node retrieved via the relational data query to the authenticated user of the first node, wherein
the authenticated user of the first node is permitted access to data about the second node when the second node is among the subset of the connected nodes that are connected to the first node by the plurality of paths,
the authenticated user of the first node is not permitted access to data about the second node when the second node is not among the subset of the connected nodes that are connected to the first node by the plurality of paths, and
the provided data about the second node comprises supply chain information about a first product, and at least one path of the plurality of paths that connects the first node and the second node represents a first supply chain for the first product.

11. The non-transitory computer readable medium of claim 10, wherein the managing further comprises:
filtering the relational data query based on permissions for the first node stored at a trusted store by augmenting the relational data query with security parameters that provide record level access to the secure database.

12. The non-transitory computer readable medium of claim 11, wherein the security parameters used to augment the relational data query comprise one or more keys such that secured records within the data tables requested by the relational data query are retrieved when the one or more keys include a key that corresponds to the secured records, and the one or more keys used to augment the relational data query are based on permissions for the first node relative to the second node.

13. The non-transitory computer readable medium of claim 10, wherein the data tables of the secure database maintain a pre-computed version of the network that is configured to return the plurality of paths for the first node based on the relational data query.

14. The non-transitory computer readable medium of claim 13, wherein the pre-computed version of the network is maintained by queuing deltas that represent changes to the plurality of connected nodes and updating the data tables of the secure database by processing a queued delta.

15. The non-transitory computer readable medium of claim 13, wherein the network with the plurality of connected nodes comprises a social graph, and the pre-computed version of the network comprises the social graph mapped onto the data tables of the secure database.

16. The non-transitory computer readable medium of claim 13, wherein one or more parts and one or more plans that comprise a plurality of parts are defined for the plurality of connected nodes, and wherein a connection between two nodes of the network is based on a correspondence between a plan defined for a first of the two nodes that matches a part defined for a second of the two nodes.

17. The non-transitory computer readable medium of claim 16, wherein the pre-computed version of the network is maintained by determining a transitive closure for the network, and the transitive closure is determined using connections among the plurality of connected nodes based on a correspondence between plans and parts for the plurality of connected nodes.

18. The non-transitory computer readable medium of claim 10, wherein the supply chain information about the first product comprises a trade or product certification and an expiration status of the trade or product certification.

19. A system comprising:
a processing device in communication with a memory device, the processing device configured to manage a network of nodes that represent a supply chain, the managing comprising:
storing a network with a plurality of connected nodes, wherein,
the connected nodes represent suppliers and customers,
paths among the connected nodes represent supply chains for one or more products, and
the paths among the connected nodes are dynamic based on interactions among the suppliers and customers;
receiving, from an authenticated user of a first node of the network, a request to retrieve data about a second node of the network;
generating a relational data query to retrieve the requested data from data tables of a secure database that stores the network, wherein the first node is connected by one or more paths with a subset of the connected nodes, each of the plurality of paths connects a plurality of the subset of connected nodes to the first node, and the authenticated user of the first node comprises access permissions to access data about the subset of the connected nodes; and
providing, when the access permissions for the authenticated user of the first node permit access to data about the second node, data about the second node retrieved via the relational data query to the authenticated user of the first node, wherein
the authenticated user of the first node is permitted access to data about the second node when the second node is among the subset of the connected nodes that are connected to the first node by the plurality of paths,
the authenticated user of the first node is not permitted access to data about the second node when the second node is not among the subset of the connected nodes that are connected to the first node by the plurality of paths, and
the provided data about the second node comprises supply chain information about a first product, and at least one path of the plurality of paths that connects the first node and the second node represents a first supply chain for the first product.

20. The system of claim 19, wherein the managing further comprises:
filtering the relational data query based on permissions for the first node stored at a trusted store by augmenting the relational data query with security parameters that provide record level access to the secure database, wherein the security parameters used to augment the relational data query comprise one or more keys such that secured records within the data tables requested by the relational data query are retrieved when the one or more keys include a key that corresponds to the secured records.

* * * * *

UNITED STATES PATENT AND TRADEMARK OFFICE
CERTIFICATE OF CORRECTION

| | | |
|---|---|---|
| PATENT NO. | : 11,936,529 B2 | |
| APPLICATION NO. | : 17/469432 | |
| DATED | : March 19, 2024 | |
| INVENTOR(S) | : Woodward et al. | |

It is certified that error appears in the above-identified patent and that said Letters Patent is hereby corrected as shown below:

On the Title Page

On page 2, Column 2, item (56) under Other Publications, Line 8, delete "Comuting," and insert -- Computing, --, therefor.

In the Specification

In Column 9, Line 31, delete "certifications,)," and insert -- certifications), --, therefor.

In Column 14, Line 13, delete "PCORG_TC_ING_CONNPATH_H" and insert -- PC_ORG_TC_ING_CONN_PATH_H --, therefor.

In Columns 15-16, Line 3, delete "preformed" and insert -- performed --, therefor.

In Column 15, Line 36, after ""X"" insert -- . --, therefor.

In Column 18, Line 23, delete "application (web.xml)." and insert -- application(web.xml). --, therefor.

In Column 19, Line 22, after "interface" insert -- . --, therefor.

In Column 24, Line 20, delete "BarChart" and insert -- BarChart, --, therefor.

In Columns 27-28, Line 50, delete "Rbdms" and insert -- Rdbms --, therefor.

In Columns 27-28, Line 51, delete "Rbdms" and insert -- Rdbms --, therefor.

Signed and Sealed this
Sixth Day of August, 2024

Katherine Kelly Vidal
*Director of the United States Patent and Trademark Office*